United States Patent
Sriram et al.

(10) Patent No.: US 9,641,342 B2
(45) Date of Patent: *May 2, 2017

(54) TRACKING UNITIZATION OCCURRING IN A SUPPLY CHAIN

(71) Applicant: SKUChain, Inc., Mountain View, CA (US)

(72) Inventors: Srinivasan Sriram, Mountain View, CA (US); Zaki N Manian, Los Altos Hills, CA (US)

(73) Assignee: SKUCHAIN, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/139,217

(22) Filed: Apr. 26, 2016

(65) Prior Publication Data

US 2017/0083860 A1    Mar. 23, 2017

Related U.S. Application Data

(63) Continuation of application No. 14/632,499, filed on Feb. 26, 2015, now Pat. No. 9,436,923.

(51) Int. Cl.
*H04L 29/06* (2006.01)
*H04L 9/32* (2006.01)
*G06Q 10/08* (2012.01)

(52) U.S. Cl.
CPC ....... *H04L 9/3247* (2013.01); *G06Q 10/0833* (2013.01); *H04L 9/3263* (2013.01); *H04L 63/0823* (2013.01)

(58) Field of Classification Search
CPC ....... H04L 9/002; H04L 9/006; H04L 9/3239; H04L 9/3268; H04L 2209/805; G06Q 30/018; G06Q 10/08; G06F 17/30569
(Continued)

(56) References Cited

U.S. PATENT DOCUMENTS 5,478,990 A    12/1995   Montanari et al.
5,892,900 A     4/1999   Ginter
(Continued)

OTHER PUBLICATIONS

Back, Adam, et al. "Enabling blockchain innovations with pegged sidechains." (2014). http://cryptolibrary.org/; Date: 2014 pp. 1-25.*
(Continued)

*Primary Examiner* — Harunur Rashid
(74) *Attorney, Agent, or Firm* — Perkins Coie LLP; Michael A. Glenn

(57) ABSTRACT

Various embodiments include a method of tracking a chain of custody of an item in a supply chain. A computer system implements a computer interface with a distributed consensus network comprised of computing devices configured to verify one or more waiting transaction records for addition into one or more blocks in a block chain representing a cryptographically verifiable ledger. The order of the block chain is cryptographically protected against tampering by the computing devices. The computer system can track provenance of the item by identifying an existing record in the block chain. The existing record can place a first quantity of a first stock keeping unit (SKU) at a first address. The computer system can then unitize the item by publishing a new record to the block chain. The new record indicates the existing record as a source record and associates a new SKU with a destination address.

18 Claims, 11 Drawing Sheets

(58) Field of Classification Search
USPC .......................................................... 713/176
See application file for complete search history.

(56) References Cited

U.S. PATENT DOCUMENTS

| | | | |
|---|---|---|---|
| 6,044,462 A | 3/2000 | Zubeldia et al. | |
| 6,192,370 B1 | 2/2001 | Primsch | |
| 6,829,333 B1 | 12/2004 | Frazier | |
| 7,181,017 B1 | 2/2007 | Nagel et al. | |
| 7,222,791 B2 | 5/2007 | Heilper et al. | |
| 7,545,930 B1 | 6/2009 | Shields et al. | |
| 8,677,133 B1 | 3/2014 | Spencer | |
| 8,781,882 B1 | 7/2014 | Arboletti et al. | |
| 2001/0032310 A1 | 10/2001 | Corella | |
| 2001/0042050 A1 | 11/2001 | Fletcher et al. | |
| 2005/0050122 A1 | 3/2005 | Blumenthal et al. | |
| 2005/0254658 A1 | 11/2005 | Brown et al. | |
| 2006/0059333 A1 | 3/2006 | Gentry et al. | |
| 2006/0100920 A1 | 5/2006 | Pretorius et al. | |
| 2007/0074036 A1 | 3/2007 | Ramzan et al. | |
| 2007/0156281 A1 | 7/2007 | Leung et al. | |
| 2008/0010239 A1* | 1/2008 | Nochta .................. G06Q 10/08 | |
| 2008/0016167 A1 | 1/2008 | Lund et al. | |
| 2009/0141891 A1 | 6/2009 | Boyen et al. | |
| 2009/0187482 A1 | 7/2009 | Blount et al. | |
| 2009/0198596 A1 | 8/2009 | Dolan et al. | |
| 2011/0016318 A1* | 1/2011 | Syngkon ................ G06Q 10/08 | |
| | | | 713/170 |
| 2011/0320805 A1* | 12/2011 | Chaves ................ G06Q 10/087 |
| | | | 713/150 |
| 2012/0210118 A1 | 8/2012 | Chaves et al. | |
| 2012/0213366 A1 | 8/2012 | Brown et al. | |
| 2013/0290358 A1* | 10/2013 | Dogaru ............. G06F 17/30569 |
| | | | 707/756 |
| 2014/0129288 A1 | 5/2014 | Eager et al. | |
| 2014/0229384 A1 | 8/2014 | St. Johns et al. | |
| 2015/0100475 A1 | 4/2015 | Cummings et al. | |

OTHER PUBLICATIONS

American National Standard for Financial Services, "Public Key Cryptography for the Financial Services Industry, Agreement of Symmetric Keys Using Discrete Logarithm Cryptography," American National Standards Institute, Accredited Standards Committee X9, Incorporated, Financial Industry Standards, Nov. 19, 2003, 136 pages.

Microprocessor and MS Committee, "IEEE Standard Specifications for Public-Key Cryptography," IEEE Computer Society, Aug. 29, 2000, pp. 1-226.

* cited by examiner

TRACKING UNITIZATION OCCURRING IN A SUPPLY CHAIN

CROSS-REFERENCE TO RELATED APPLICATION(S)

This application is a continuation of U.S. patent application Ser. No. 14/632,499, entitled "TRACKING UNITIZATION OCCURRING IN A SUPPLY CHAIN," filed Feb. 26, 2015, which relates to U.S. patent application Ser. No. 14/562,303, entitled "CRYPTOGRAPHIC VERIFICATION OF PROVENANCE IN A SUPPLY CHAIN," which was filed on Dec. 5, 2014, all of which are incorporated by reference herein in their entirety.

TECHNICAL FIELD

At least one embodiment of this disclosure relates generally to logistics data management, and in particular to supply chain tracking.

BACKGROUND

Logistics is the management of the flow of movable items between the point of origin and the point of consumption in order to meet requirements of end-customers, manufacturers, or a distribution node therebetween. One of the goals of a logistics data management system is to ensure security by tracking of goods through the entire supply chain from origin to consumption. Conventional tracking frequently involves a database at each node along a supply chain, where the database maps identifiers to intake or shipping information. Cross-company tracking can occur if an entity correlates information from different databases using unique identifiers.

However, this method of cross-company tracking will require that an individual company labels or otherwise identifies its shipments with the same identifiers as other companies. This is unpractical for many companies, especially when packaging of items are changed from one company to another. For example, one company may label a case, whereas another company may label an entire pallet full of cases. For another example, some companies intake multiple components to create a composite item for sale. In these situations, conventional methods of tracking goods are difficult or impossible to implement. Nevertheless, consumers and companies involved in a supply chain can still benefit from provenance information whether or not items are re-packaged or re-combined.

SUMMARY

Various embodiments are directed at utilizing one or more cryptographic methods of tracking unitization of items throughout a supply network. This disclosure relates to U.S. patent application Ser. No. 14/562,303, filed on Dec. 5, 2014, which is incorporated by reference in its entirety.

Some embodiments include a system for tracking end-to-end provenance of labeled goods despite re-unitization, repackaging, or transformation of the goods. The system can track provenance of such items. The system can mint cryptographic codes. Each cryptographic code can include a private key to serve as a label for goods in the supply network and a public key that serves to identify a cryptographic address in a distributed consensus network. The distributed consensus network can maintain a cryptographically verifiable record chain in one or more multiple computing nodes. The order of the record chain is enforced cryptographically. The cryptographically verifiable record chain, for example, can represent a public ledger, as described further below. The private key can be used to verify the ownership of the cryptographic address.

The disclosed system can track transference of ownership of a package (e.g., a physical or virtual good or composition of goods) in the supply network by minting the cryptographic codes and distributing the cryptographic codes to entities within the supply network. An entity can request to publish a cryptographically verifiable record, which establishes ownership of a package by the entity, into the distributed consensus network.

The disclosed system also advantageously enables an entity to request to publish a cryptographically verifiable record that tracks unitization of a package. In some cases, the cryptographically verifiable record can simultaneously establish a transfer of ownership. In various embodiments, the disclosed system facilitates publishing of cryptographically verifiable records that track various divisions, composition, and mixing of one or more source packages into one or more destination packages in the distributed consensus network.

Some embodiments of this disclosure have other aspects, elements, features, and steps in addition to or in place of what is described above. These potential additions and replacements are described throughout the rest of the specification

Figure 1:
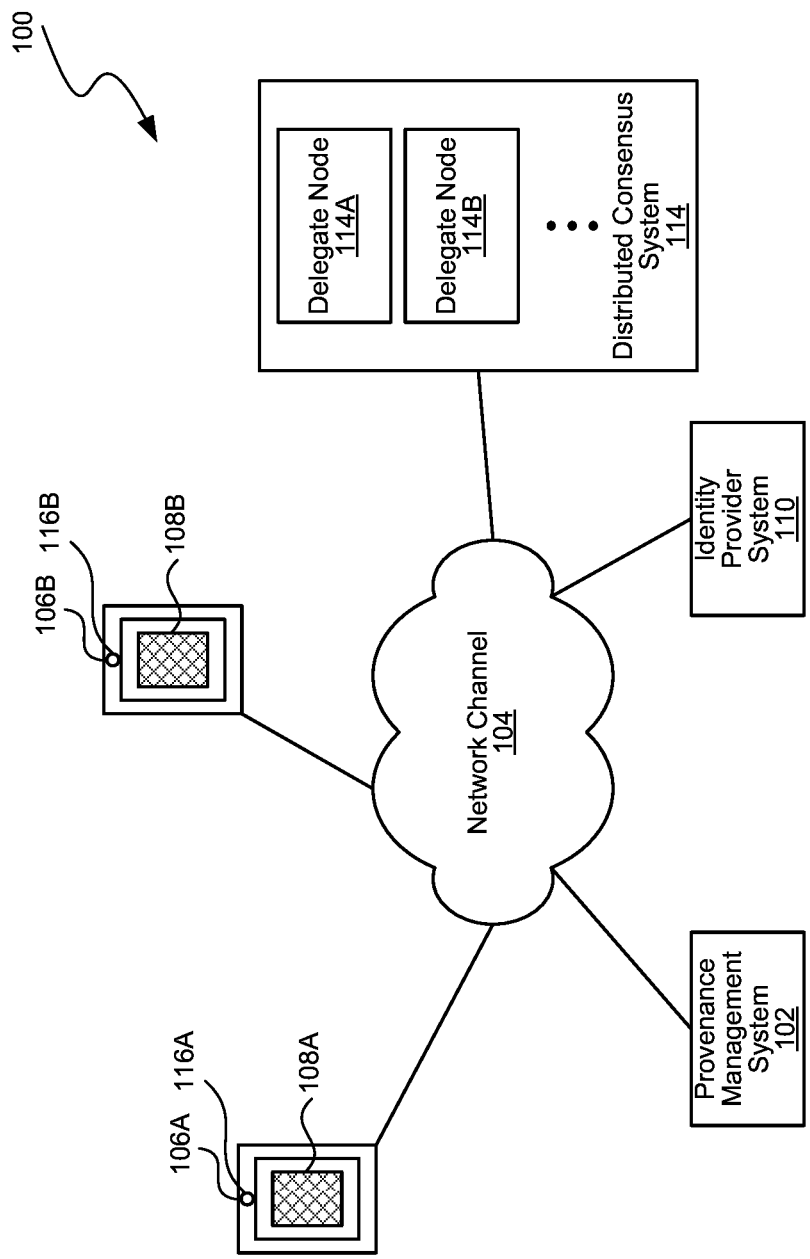
FIG. 1 is a block diagram illustrating a cryptography-based logistic platform, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Provenance refers to an authentic identity of the origin of a quantity of goods. Provenance tracking can be enabled by a computer system (e.g., one or more computer servers or other computing devices), hereinafter refers to as the "provenance management system." The provenance management system can maintain one or more profiles of one or more participant entities that participate in its a logistic platform. Each profile can include at least a public identity key (e.g., a public key for asymmetric cryptography) corresponding to a participant entity. The public identity key is used to verify a cryptographic signature made by the participant entity.

When a first company manufactures a first quantity of goods, a first computing device controlled by the first company can report the ownership of the first quantity of goods via a logistic transaction record to a public ledger database. The public ledger database can store logistic transaction records in a distributed manner. The first computing device can report the logistic transaction record to the public ledger database via the provenance management system. The first computing device can cryptographically sign this logistic transaction with its private cryptographic key.

When the first company prepares to deliver the first quantity of goods to its various customers, the first computing device can request a proof of provenance code (hereinafter a "popcode") label from the provenance management system or an agent thereof. The popcode label encodes a private popcode key used to cryptographically sign a logistic transaction record. The provenance management system can store a public popcode key corresponding to the private popcode key in its trusted storage such that it can verify the signature made by the private popcode key (e.g., hence establishing a proof-of-possession). In some embodiments, the provenance management system can store the popcode key pair in its trusted storage. For example, a popcode label can be a 32 bits barcode, such as a two-dimensional barcode. In some embodiments, the first computing device can request a batch of popcode labels to label its goods. The first computing device can report a logistic transaction record that assigns a second quantity of goods to a popcode address onto the public ledger database. The second quantity of goods can overlap at least partially with the first quantity of goods.

The provenance management system can maintain the public ledger database by interfacing with a distributed consensus system comprising multiple delegation nodes (e.g., computing devices). For example, the public ledger database can be maintained in a distributed manner as a block chain. The block chain keeps track of all confirmed logistic transactions that occur within the logistics platform maintained by the provenance management system. A logistic transaction is an inventory record of quantified goods that occurs within a company or between companies. A logistic transaction can define a quantity of one or more items associated with one or more types of items. A type of item can be referred to as a stock keeping unit (SKU) type or a SKU. The logistic transaction can define a source of the items, such as by referencing one or more previous logistic transactions that source at least a subset of the quantity of items described in the current logistic transaction. The logistic transaction can define a destination address (e.g., an identity address or a popcode address) of where the items are assigned.

In several embodiments, the block chain confirms to the logistic transactions via the distributed consensus system. The distributed consensus system confirms waiting logistic transactions by including them in the block chain. The distributed consensus system enforces a chronological order in the block chain and hence protects the neutrality of a network of computing devices that implements the public ledger database.

The method described enables the block chain to keep track of multiple logistic transactions. Any consumer or company can access the block chain to verify the provenance associated with a set of items by access the block chain. For example, a popcode label consistent with the logistics platform can be scanned to check against the public ledger database represented by the block chain.

FIG. 1 is a block diagram illustrating a cryptography-based logistic platform 100, in accordance with various embodiments. The cryptography-based logistic platform 100 is maintained by a provenance management system 102. The provenance management system 102 can be a cloud-based system implemented by one or more computing devices (e.g., computer servers). The provenance management system 102 is coupled to a network channel 104. For example, the network channel 104 can be a wide area network (e.g., the Internet) or one or more connected local area networks.

The provenance management system 102 exposes application service interfaces to one or more participant devices (e.g., a participant device 106A and a participant device 106B, collectively as the "participant devices 106"). The participant devices 106 are computing devices that are registered with the provenance management system 102. For example, the participant devices 106 can each implement an agent application (e.g., an agent application instance 108A or an agent application instance 108B, collectively or individually referred to as the "agent application 108"). Each of the participant devices 106 can correspond to a participant entity. A participant entity is a company that, at some point, is in possession of an item tracked by the provenance management system 102. For example, the participant entity can be a component manufacturer, an assembly factory, a distributor, a wholesaler, a retailer, or a consumer.

The agent application 108 utilizes the application services provided by the provenance management system 102. For example, the agent application 108 can facilitate registration of an entity account (e.g., a participant identity), monitoring provenance or logistic information associated with one or more movable items, reporting a logistic transaction for public record keeping, or any combination thereof.

Registering Entity Account

To register an entity account, the provenance management system 102 can communicate with an identity provider system 110. The provenance management system 102 can interface with the identity provider system 110 using an electronic interface or other digital means to validate the entity account. This can occur when registering the entity account or when receiving an access request (e.g., to report a logistic transaction or extract logistic information) from a participant device. The identity provider system 110 can affirm or deny that a requester is an authorized participant in the cryptography-based logistic platform 100.

Figure 11:
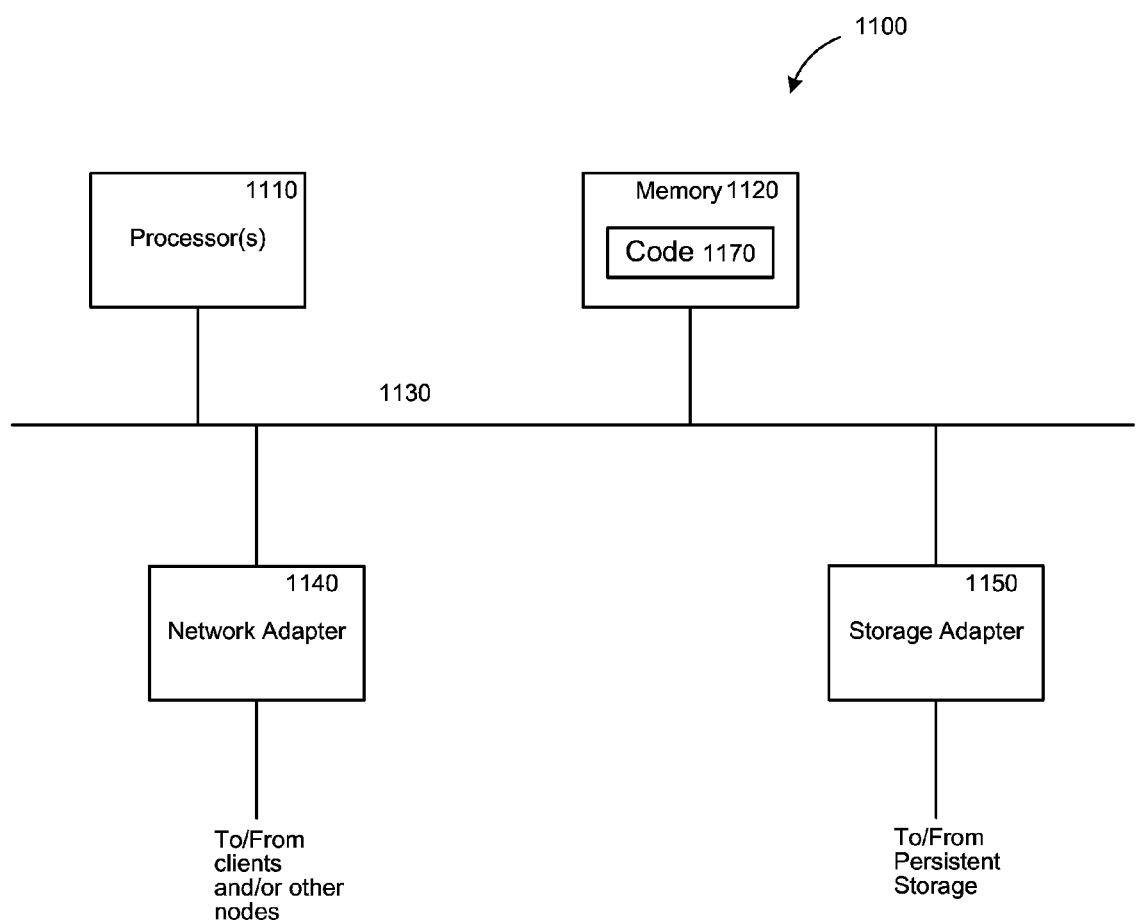
FIG. 11 is a block diagram of an example of a computing device, which may represent one or more computing device or server described herein, in accordance with various embodiments.

The identity provider system 110 can be implemented by a computer system, such as the computing device 1100 of FIG. 11. The identity provider system 110 can be implemented by one or more computing devices. The identity provider system 110 provides an application service or a web-based service over the network channel 104 to authenticate a participant entity (e.g., a person, a group, or an organization). For example, the identity provider system 110 can be a social networking system, a location-based service, a social media system, a government service, a public information service, a public registrar service, or any combination thereof. The identity provider system 110 can implement a proprietary login interface for the entity or a representative of the participant entity to authenticate its identity (e.g., by a knowledge-based authentication, possession-based authentication, or inherence-based authentication).

In some embodiments, the identity provider system 110 is part of the provenance management system 102. In some embodiments, the provenance management system 102 is part of the identity provider system 110. The provenance management system 102 can receive and register a public identity key from a participant device when the participant entity's identity is authenticated. The public identity key can be used to verify cryptographic signatures made using a private identity key known only by agents of the participant entity. In some embodiments, the provenance management system 102 can register an identity address associated with the public identity key.

The provenance management system 102 can serve as a trusted authority that stores a profile of an entity account corresponding to a unique entity authenticated by the identity provider system 110. The profile of the entity account can include an identity address. Logistic transactions can reference the identity address as a source address or a destination address. For example, the provenance management system 102 can bind an identity address to one or more logistic transaction records represented in a public ledger database. The public ledger database is a computer system that provides an irrepudiable proof that a given logistic transaction was conducted between two addresses in the public ledger database. For example, an address can be an identity address corresponding to a participant entity (e.g., an entity whose identity is confirmed by the identity provider system 110). For another example, an address can be a popcode address corresponding to a moving package labeled with a popcode label. In several embodiments, the public ledger database can enforce the irrepudiability by enforcing the sequence of logistic transactions using cryptographic means.

In some embodiments, the public ledger database can be implemented by a distributed consensus system 114. The distributed consensus system 114 can be implemented by one or more delegation nodes (e.g., a delegation node 114A and a delegation node 114B). The delegation nodes can be computing servers, such as one or more of the computing device 1100 of FIG. 11. The distributed consensus system 114 can confirm waiting transactions by including them in a "block chain." The distributed consensus system 114 enforces a chronological order in the block chain and hence protects the neutrality of a network of computing devices that implement the public ledger database. The block chain includes one or more sequential blocks each containing one or more logistic transactions. In some embodiments, whenever a block of transactions is created, information in the block is processed via a hash function to produce a hash value. This hash value is stored along with the new block at the end of the block chain. Each new hash is also generated based on the hash value of a previous block, hence ensuring the authenticity of the entire block chain. The chaining of the hash functions confirms that the new block—and every block after it—is legitimate. Whenever someone tampers with information within a block, every computing device with access to the block chain would be able to identify the tampering. A delegation node can be elected to add the next block whenever the delegation node is able to solve a cryptographic puzzle, e.g., by creating a hash function that generates a hash value based on the information of the block with specific characteristics.

The sequence of the blocks denotes the sequence of how the logistic transactions occur. The logistic transactions can be associated with one or more source addresses and one or more destination addresses. A child logistic transaction can reference a parent logistic transaction, where at least a source address of the child logistic transaction is a destination address of the parent logistic transaction. A chaining of these parent-child relationships can create a provenance tree of ancestor logistic transactions and/or a provenance tree of descendant logistic transactions relative to a logistic transaction of interest. In several embodiments, the provenance tree of the ancestor logistic transactions and the provenance tree of the descendent logistic transactions form a directed acyclic graph that can serve as an audit trail of provenance and distribution information from a single distribution node. In some cases, the logistic transactions can indicate how items are transferred from one distribution point to another. In some cases, the logistic transactions can indicate how inventory operations affect the quantity (e.g., via repackaging) and item type of the items (e.g., via assembly of components or reconfiguration of products). A logistic transaction, which has an identity address as a destination address, can indicate the inventory of the corresponding participant identity/entity account in a public ledger.

Items that are tracked by the cryptography-based logistic platform 100 can be referred to as stock keeping units. A SKU can be a distinct item, such as a product or a quantified service, as is offered for sale that embodies all attributes associated with the item, where the attributes distinguish the item from all other items. For a product, these attributes include at least manufacturer, product description, material, size, color, packaging, and warranty terms. As a SKU moves down the supply chain, the SKU can pass through a number of hands (e.g., distribution nodes), for example, from a manufacturer, to a distributor, to a wholesaler, to a retailer, and then to a consumer. At each of the distribution nodes, the SKU's packaging and size can be transformed. A first SKU can be combined with one or more other SKUs to create a second SKU along the supply chain.

The agent application 108 can facilitate identifying provenance information of a SKU. For example, the agent application 108 can receive a SKU value identifier associated with an identity address. The agent application 108 can send the SKU value identifier and the identity address to the provenance management system 102. The provenance management system 102 can identify a logistic transaction (e.g., the latest transaction) in the block chain maintained by the distributed consensus system 114. By identifying the latest transaction involving the SKU value identifier in the block chain, the provenance management system 102 can traverse the block chain to identify a tree of parent logistic transactions. The tree of parent logistic transactions can be a source of provenance information that enables the participant devices 106 or the provenance management system 102 (e.g., corresponding to the identity address) to trace or track confirmed distribution nodes that led to the SKU arriving at its facilities.

Reporting Logistic Records

The agent application 108 can facilitate the participant devices 106 to report records of logistic transactions. The logistic transactions can include address information (e.g., source and destination addresses), SKU value identifier (e.g., describing a SKU package value including quantity of an item type), and a timestamp of the reporting.

A SKU package of a logistic transaction can be sourced from an identity address (e.g., the source address is the identity address). For example, when reporting this type of logistic transactions, each logistic transaction is cryptographically signed by a private identity key associated with the identity address. The private identity key is an asymmetric cryptography key known only by an agent of the participant entity. These logistic transactions can be referred to as "logistic internal transactions." The logistic internal transactions can track internal operations (e.g., delivery preparation, re-packaging, assembly, and/or subdivision) of SKU inventory possessed by the participant entity associated with the identity address.

The participant devices 106 can generate the identity key pairs (e.g., a public identity key and a private identity) when registering with the provenance management system 102 or the identity provider system 110. For example, the identity key pairs can be generated via the agent application 108. The participant devices 106 can generate the identity keys from a random nonce or an alternate secure source of information. For example, the provenance management system 102 or the identity provider system 110 can store the public identity key in its trusted store once the identity provider system 110 verifies identity credentials from a participant device. In some embodiments, there can be multiple identity key pairs for each participant entity. In these embodiments, privacy for the participant entities is protected and the risk of public exposure of confidential business information is mitigated. The destination address of a logistic internal transaction can be a popcode address (e.g., when the corresponding SKU package is ready for distribution) or the same identity address as the source address (e.g., when the corresponding SKU package is transformed). In some cases, the destination address of a logistic internal transaction can be a different identity address compared to the source address, such as when internally reassigning SKU packages between identity addresses belonging to the same participant entity.

A SKU package in a logistic transaction can be sourced from an incoming delivery associated with a popcode address (e.g., the source address is the popcode address). This type of logistic transactions indicates a transfer of possession of the SKU package. For example, when reporting these logistic transactions, each logistic transaction is cryptographically signed using a private identity key associated with a participant identity receiving the SKU package and a private popcode key decoded from a popcode label (e.g., a physical label) on the incoming SKU package. These logistic transactions can be referred to as "logistic transfer transactions." The logistic transfer transactions can enable the cryptography-based logistic platform 100 to track delivery of SKU packages between participant entities. In several embodiments, the logistic transfer transaction is reported by the participant entity receiving a SKU package.

In some embodiments, the provenance management system 102 can generate popcode key pairs utilizing a deterministic key generation algorithm. For example, the provenance management system 102 can generate the popcode key pairs in batches utilizing a random number generator. The provenance management system 102 can store the public popcode keys in its trusted storage (e.g., along with the public identity keys). In some embodiments, the provenance management system 102 can store the popcode key pairs in its trusted storage. Agents of the provenance management system 102 can then print out popcode labels, each encoding a private popcode key. The popcode labels can be encoded optically, electronically, mechanically, magnetically, or any combination thereof. A private popcode key from a popcode label is a proof of possession of a SKU package.

Once a SKU package is labeled with a popcode label, the SKU package can be transferred to a different distribution node. For example, a manufacturer participant entity can deliver the SKU package to a distributor participant entity. The receiving participant entity can be responsible for reporting the logistic transfer transaction to the provenance management system 102.

In some embodiments, the agent application 108 can access scanner components (e.g., a scanner component 116A and a scanner component 116B, collectively as the "scanner components 116") of the participant devices 106. The scanner components 116 can be used to read and/or decode the private popcode keys from the popcode labels. For example, a scanner component can be a camera capable of scanning a barcode (e.g., a one-dimensional or a two-dimensional barcode) on a popcode label. For another example, a scanner component can be a radiofrequency identification (RFID) reader capable of scanning an RFID tag in a popcode label. The agent application 108 can generate and report a logistic transfer transaction to the provenance management system 102. For example, the agent application 108 can cryptographically sign the logistic transfer transaction using the private identity key of the receiver participant entity and the private popcode key decoded via the scanner component from the popcode label.

When the provenance management system 102 receives a logistic transaction from a participant device, the provenance management system 102 can publish the logistic transaction into the distributed consensus system 114. Once published into the distributed consensus system 114, the logistic transaction becomes part of the block chain that is cryptographically irrepudiable.

Figure 2:
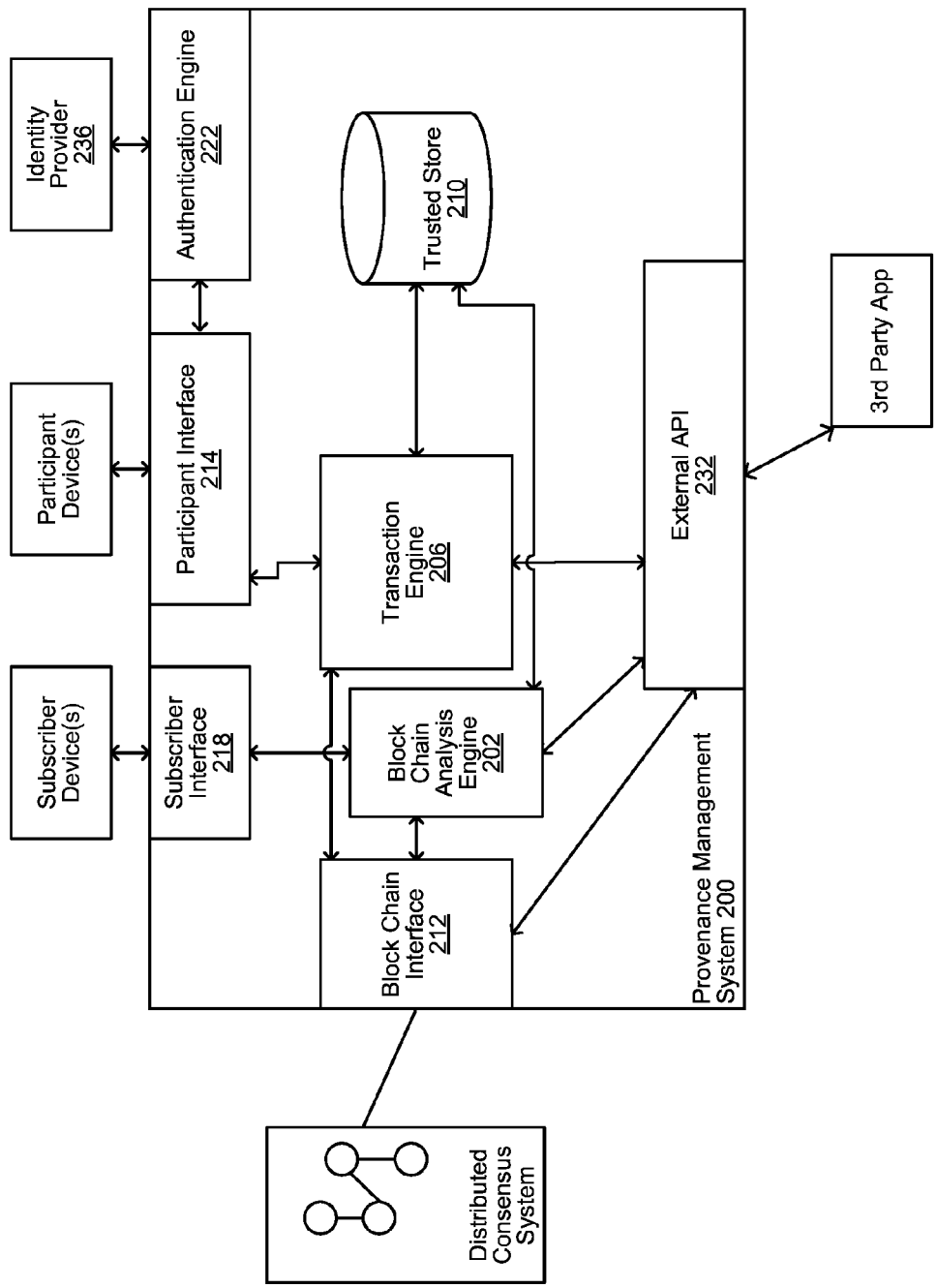
FIG. 2 is a block diagram illustrating a provenance management system, in accordance with various embodiments.

FIG. 2 is a block diagram illustrating a provenance management system 200, in accordance with various embodiments. The provenance management system 200 can be the provenance management system 102 of FIG. 1. The provenance management system 200 can facilitate a logistic platform, such as the cryptography-based logistic platform 100 of FIG. 1. The provenance management system 200 can be implemented by the computing device 1100 of FIG. 11. The provenance management system 200 can include a block chain analysis engine 202 and a transaction engine 206. The provenance management system 200 can maintain a trusted store 210 of cryptographic public keys used to verify cryptographic signatures on logistic transaction records.

The block chain analysis engine 202 is coupled to a block chain interface 212. The block chain interface 212 can access a distributed consensus system, such as the distributed consensus system 114 of FIG. 1. The distributed consensus system can be implemented by a distributed network of delegation nodes. The distributed consensus system maintains a cryptographically enforced sequence of blocks, each block containing a set of logistic transactions that occurs on the logistic platform. The block chain analysis engine 202 can be used to analyze logistic transactions represented in the block chain to determine patterns, events, trends, warnings, or any combination thereof, in relation to the movements and transformations of SKUs through the logistic platform.

The transaction engine 206 is coupled to a participant interface 214. The participant interface 214 can be an application programming interface (API) for a web-based application (e.g., a flash application, a JavaScript application, or a mobile application) running on a participant device (e.g., one of the participant devices 106 of FIG. 1). The transaction engine 206 facilitates authentication and recording of logistic transaction records reported by participant devices. The transaction engine 206 can access the trusted store 210 to extract public identity keys and public popcode keys to verify cryptographic signatures on the reported logistic transactions.

In some embodiments, the provenance management system 200 can also implement a subscriber interface 218. A subscriber interface 218 enables access to the public ledger in the distributed consensus system. The subscriber interface 218 can communicate with the block chain analysis engine 202 and/or directly with the block chain interface 212 to access the information in the distributed consensus system. In some embodiments, a subscriber device can subscribe to information relating to a SKU package. The provenance management system 200, via the subscriber interface 218, can push messages relating to a SKU package to the subscriber device whenever it becomes available. For example, the message can include information about a recall, a product defect, a transfer of possession, a transformational item type, or any combination thereof.

In some embodiments, the provenance management system 200 implements an authentication engine 222. The authentication engine 222 can communicate with an identity provider system, such as the identity provider system 110 of FIG. 1, to authenticate participant devices communicating via the participant interface 214.

In some embodiments, the provenance management system 200 implements an external API 232. The external API 232 provides an application interface to allow a third-party application or application service to access the information available via the provenance management system 200. For example, a third-party application can provide analytics based on the information on the public ledger. The third-party application can access the information on the public ledger via the external API 232. The third-party application can also provide the results of the analytics to the provenance management system 200 via the external API 232.

Functional components (e.g., engines, modules, and databases) associated with each of the participant devices 106, the provenance management system 200, the identity provider system 110, and/or the distributed consensus system 114 can be implemented as circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled via one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). The systems, engines, or devices described may include additional, fewer, or different functional components for various applications.

Figure 3A:
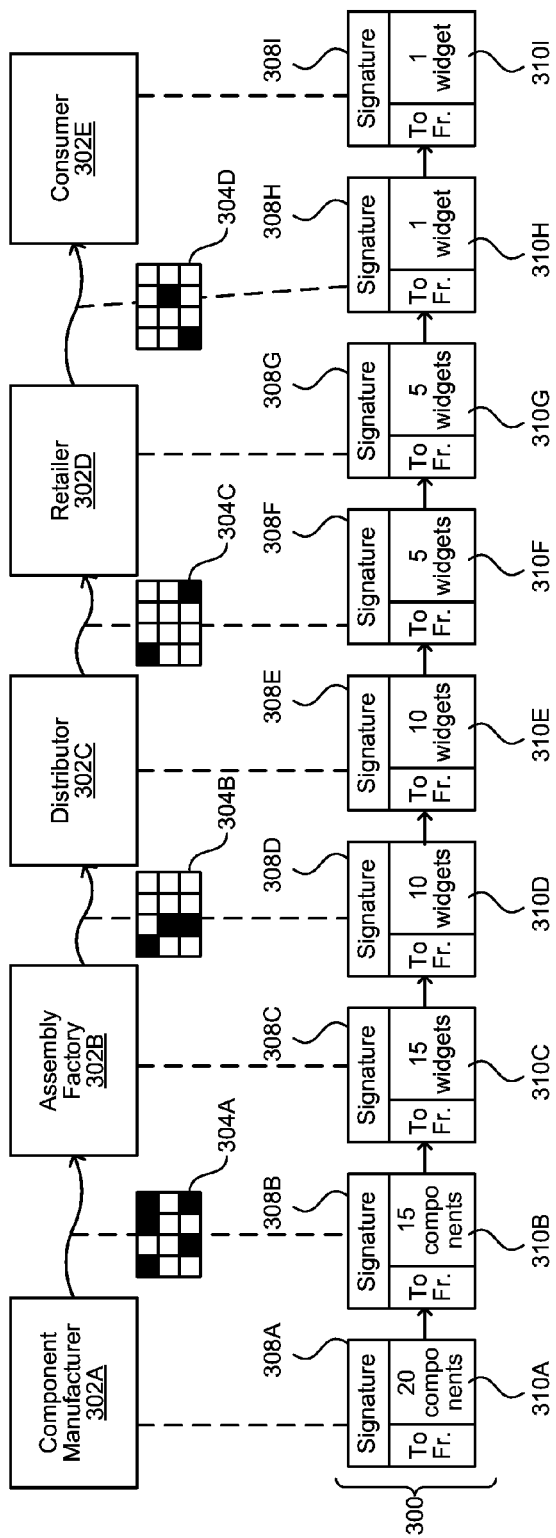
FIG. 3A is a block diagram illustrating a first example of a provenance tree comprising multiple logistic transaction records, in accordance with various embodiments.

FIG. 3A is a block diagram illustrating a first example of a provenance tree 300 comprising multiple logistic transaction records, in accordance with various embodiments. The provenance tree 300 may be maintained in a logistic platform, such as the cryptography-based logistic platform 100 of FIG. 1. The provenance tree 300 is a sequence of logistic transactions that lead to a participant entity possessing a SKU package. A computing device can derive the provenance tree 300 by accessing a public ledger implemented by a distributed consensus system (e.g., the distributed consensus system 114 of FIG. 1). For example, the provenance tree 300 can register the transfer of possession/ownership from a component manufacturer entity 302A to an assembly factory entity 302B, then to a distributor entity 302C, then to a retailer entity 302D, and then to a consumer entity 302E.

The transfer of possession/ownership is facilitated by one or more popcodes (e.g., popcode 304A, popcode 304B, popcode 304C, and popcode 304D, collectively as the "popcodes 304"). Each of the popcodes 304 can be encoded in a proof-of-provenance label of a SKU package. A final SKU package received by the consumer entity 302E may be part of other SKU packages that were delivered between the other participant entities in the logistic platform. The final SKU package received by the consumer entity 302E may also be sourced from components manufactured by different participant entities in the logistic platform.

The public ledger can include logistic transaction records (e.g., a logistic transaction 308A, a logistic transaction 308B, a logistic transaction 308C, a logistic transaction 308D, a logistic transaction 308E, a logistic transaction 308F, a logistic transaction 308G, a logistic transaction 308H, a logistic transaction 308I, collectively as the "logistic transaction records 308") throughout the provenance tree 300. For example, the logistic transaction records 308 can include logistic internal transactions (e.g., the logistic transaction 308A, the logistic transaction 308C, the logistic transaction 308E, the logistic transaction 308G, and the logistic transaction 308I) and logistic transfer transactions (e.g., the logistic transaction 308B, the logistic transaction 308D, the logistic transaction 308F, and the logistic transaction 308H).

Each of the logistic transaction records 308 is assigned to a source address and a destination address, describes a SKU package, and is cryptographically signed by one or more private keys. For example, each of the logistic internal transactions is assigned to an identity address as the source address and cryptographically signed by a private identity key corresponding to the identity address. For another example, each of the logistic transfer transactions is assigned to a popcode address and cryptographically signed by a private identity key and a private popcode key. A logistic transaction record can describe a SKU package via a SKU value identifier (e.g., describing a SKU package value). In some embodiments, the SKU package value is associated with a source transaction list (e.g., a list of previous transactions that source the items in the SKU package), at least an item type, and at least a quantity. When a SKU package is first manufactured, the source transaction can be null.

In the illustrated example, the logistic transaction 308A describes a SKU package value 310A. The SKU package value 310A describes creation of 20 components. Hence, the item type can be "components," and the quantity can be "20." The logistic transaction 308A is assigned to an identity address of the component manufacturer entity 302A. The logistic transaction 308A is cryptographically signed by a private identity key of the component manufacturer entity 302A.

The logistic transaction 308B describes a SKU package value 310B. The SKU package value 310B describes a transfer of 15 components. Hence, the output item type can be "components," and the output quantity can be "15." The logistic transaction 308B is assigned to a popcode address corresponding to the popcode 304A. The logistic transaction 308B is cryptographically signed by a private popcode key encoded as the popcode 304A. The source transaction can be the logistic transaction 308A.

The logistic transaction 308C describes a SKU package value 310C. The SKU package value 310C describes assembly of the components into 15 widgets (e.g., from the 15 components of the SKU package value 310B). Hence, the item type can be "widgets," and the quantity can be "15." The logistic transaction 308C is assigned to an identity address of the assembly factory entity 302B. The logistic transaction 308C is cryptographically signed by a private identity key of the assembly factory entity 302B. The source transaction can be the logistic transaction 308B.

The logistic transaction 308D describes a SKU package value 310D. The SKU package value 310D describes a transfer of 10 widgets. Hence, the item type can be "widgets," and the quantity can be "10." The logistic transaction 308D is assigned to a popcode address corresponding to the popcode 304B. The logistic transaction 308D is cryptographically signed by a private popcode key encoded as the popcode 304B. The source transaction can be the logistic transaction 308C.

The logistic transaction 308E describes a SKU package value 310E. The SKU package value 310E describes packaging of the 10 widgets. Hence, the item type can be "widgets," and the quantity can be "10." The logistic transaction 308E is assigned to an identity address of the distributor entity 302C. The logistic transaction 308E is cryptographically signed by a private identity key of the distributor entity 302C. The source transaction can be the logistic transaction 308D.

The logistic transaction 308F describes a SKU package value 310F. The SKU package value 310F describes a transfer of 5 widgets. Hence, the item type can be "widgets," and the quantity can be "5." The logistic transaction 308F is assigned to a popcode address corresponding to the popcode 304C. The logistic transaction 308F is cryptographically signed by a private popcode key encoded as the popcode 304C. The source transaction can be the logistic transaction 308E.

The logistic transaction 308G describes a SKU package value 310G the SKU package value 310G describes packaging of the 5 widgets. Hence, the item type can be "widgets," and the quantity can be "5." The logistic transaction 308G is assigned to an identity address of the retailer entity 302D. The logistic transaction 308G is cryptographically signed by a private identity key of the retailer entity 302D. The source transaction can be the logistic transaction 308F.

The logistic transaction 308H describes a SKU package value 310H. The SKU package value 310H describes a transfer of 1 widget. Hence, the item type can be "widgets," and the quantity can be "1." The logistic transaction 308H is assigned to a popcode address corresponding to the popcode 304D. The logistic transaction 308H is cryptographically signed by a private popcode key encoded as the popcode 304D. The source transaction can be the logistic transaction 308G.

The logistic transaction 308I describes a SKU package value 310I the SKU package value 310I describes consumption of the 1 widget. Hence, the item type can be "widgets," and the quantity can be "1." The logistic transaction 308I is assigned to an identity address of the consumer entity 302E. The logistic transaction 308I is cryptographically signed by a private identity key of the consumer entity 302E. The source transaction can be the logistic transaction 308H.

Figure 3B:
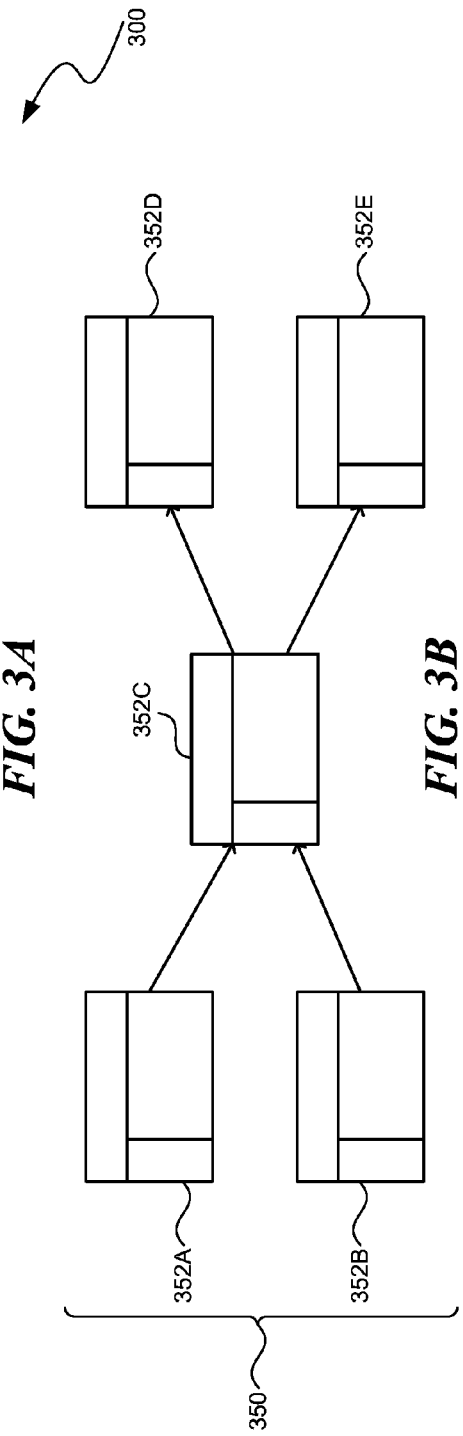
FIG. 3B is a block diagram illustrating a second example of a provenance tree comprising multiple logistic transaction records, in accordance with various embodiments.

FIG. 3B is a block diagram illustrating a second example of a provenance tree 350 comprising multiple logistic transaction records, in accordance with various embodiments. The provenance tree 350 includes sequential logistic transaction records (e.g., a logistic transaction 352A, a logistic transaction 352B, a logistic transaction 352C, a logistic transaction 352D, and a logistic transaction 352E, collectively as the "logistic transaction records 352"). Unlike the provenance tree 300, the provenance tree 350 is not a single chain.

For example, the logistic transaction 352A and the logistic transaction 352B can be logistic transfer transactions that both provide components to a logistic internal transaction (i.e., the logistic transaction 352C). In some embodiments, this can occur if a SKU package resulting from the logistic transaction 352C assembles components from the SKU packages of both the logistic transaction 352A and the logistic transaction 352B to form a new product. In some embodiments, this can occur if a SKU package resulting from the logistic transaction 352C is a repackaging of commodity items from the SKU packages of both the logistic transaction 352A and the logistic transaction 352B.

A single SKU package can also split into different distribution chains. For example, the logistic transaction 352C can be the parent logistic transaction for (e.g., sourcing) both the logistic transaction 352D and the logistic transaction 352E (e.g., dividing a SKU package value into sub-parts or quantities). In some embodiments, this can occur if the logistic transaction 352D is a logistic transfer transaction to a first customer and the logistic transaction 352E is a logistic transfer transaction to a second customer.

Various other types of logistic operations can be tracked by embodiments of provenance trees (e.g., the provenance tree 300 or the provenance tree 350). The provenance trees can support keeping a record of origination of SKUs (e.g., items or goods). For example, when a manufacturer ships an item, an authenticated device of the manufacturer can report a logistic transaction that transfers an unlabeled value to an identity address of the manufacturer. The logistic transaction can also label the value with an item type and a quantity. The authenticated device can then sign the logistic internal transaction with its private identity key.

The provenance trees can also support keeping a shipment receipt of a SKU package. For example, when a distributor receives a SKU package from a manufacturer, it can scan a popcode private key from a label on the SKU package or on a receipt of the SKU package. An authenticated device of the distributor can verify with an identity provider system (e.g., the identity provider system 110 of FIG. 1) that the logistic transaction putting goods into the popcode address was signed by one of the registered identity keys for the manufacturer.

The provenance trees can support keeping a record of repackaging and unitization. For example, when a reseller receives multiple SKU packages, it can combine them into a single SKU package. For another example, when a reseller receives a single SKU package of multiple items, it can divide them into multiple SKU packages in multiple child logistic transactions. An authenticated device of the reseller can record this re-packaging in a logistic transfer transaction. The logistic transfer transaction can document transfer of the SKU package value from an incoming popcode address to either an outgoing popcode address or an identity address of the reseller. The authenticated device can cryptographically sign the logistic transfer transaction with the incoming popcode private key and the private identity key of the reseller. The logistic transfer transaction can assign at least a portion of the quantity of the incoming SKU package value to an outgoing popcode address. Any remaining SKU package value associated with the incoming popcode address can be stored in the identity address of the reseller.

Figure 4:
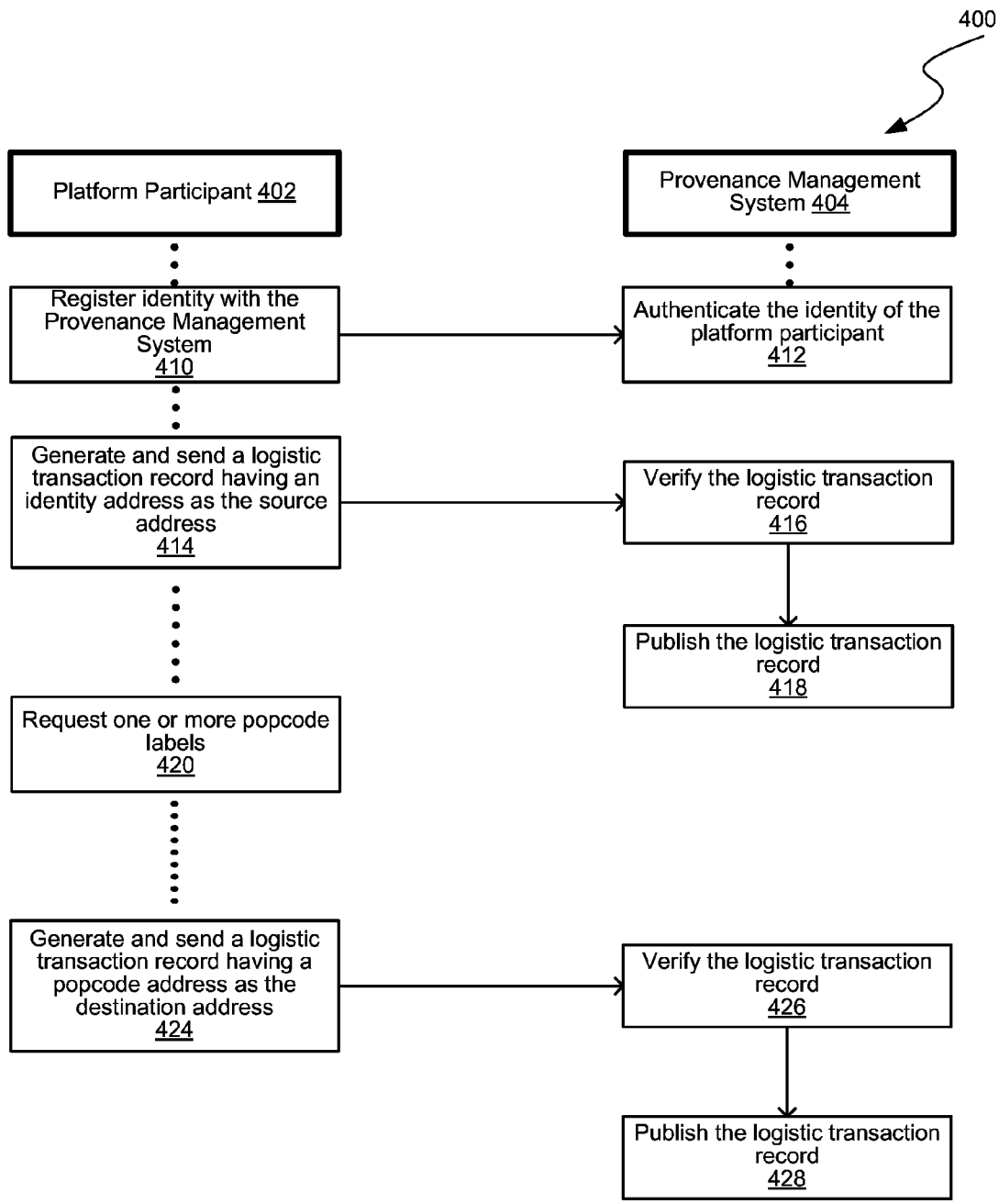
FIG. 4 is a data flow diagram illustrating a method of cryptographically securing provenance information during logistic operations, in accordance with various embodiments.

FIG. 4 is a data flow diagram illustrating a method 400 of cryptographically securing provenance information during logistic operations, in accordance with various embodiments. The method steps can be represented by blocks in the data flow diagram. The method 400 can involve at least a platform participant 402. For example, the platform participant 402 can be represented by a computing device (e.g., one of the participant devices 106) controlled by a participant entity involved in a logistic platform, such as the cryptography-based logistic platform 100 of FIG. 1. The method 400 can also involve a provenance management system 404, such as the provenance management system 102 of FIG. 1 or the provenance management system 200 of FIG. 2.

At block 410, the platform participant 402 can register its identity with the provenance management system 404. In response to the registration at block 412, the provenance management system 404 can authenticate the identity of the platform participant 402. Registration with the provenance management system can include sending a public identity key for storage in a trusted store of the provenance management system.

At block 414, the platform participant 402 can generate and send a logistic transaction record to the provenance management system 404 when SKU packages become available in its inventory. For example, the SKU packages can become available through manufacturing, assembly, repackaging, or any combination thereof. This logistic transaction record can describe one or more logistic internal transactions. For another example, the SKU packages can become available when shipments from a supplier are received. This logistic transaction record can describe one or more logistic transfer transactions.

The platform participant 402 can cryptographically sign the logistic transaction record. For example, the platform participant 402 can cryptographically sign the logistic transaction record using at least its private identity key. For another example, where the logistic transaction record corresponds to a logistic transfer transaction, the platform participant 402 can cryptographically sign the logistic transaction record using both its private identity key and a private popcode key decoded from a popcode label on the SKU packages.

At block 416, the provenance management system 404 can verify the logistic transaction record. For example, the provenance management system 404 can verify that the cryptographic signature in the logistic transaction record matches a public identity key and/or a public popcode key. The provenance management system 404 can determine which public key(s) to check against based on the source address(es) indicated in the logistic transaction record. For example, if the source address indicates a popcode address, then the provenance management system 404 can determine that the logistic transaction record corresponds to a logistic transfer transaction. Therefore, the provenance management system 404 then can check the cryptographic signature against the public popcode key corresponding to the popcode address and against the public identity key corresponding to the destination address. For example, if the source address indicates an identity address, then the provenance management system 404 can determine that the logistic transaction record corresponds to a logistic internal transaction. Therefore, the provenance management system can check the cryptographic signature against the public identity key corresponding to the source address.

At block 418, the provenance management system 404 can publish the logistic transaction record to a distributed consensus system (e.g., the distributed consensus system 114 of FIG. 1). When a logistic transaction record is published into a delegation node in the distributed consensus system, the logistic transaction record well-being distributed to other delegation nodes in due time. The sequence of logistic transaction records in the block chain is cryptographically ensured such that the sequence is irrepudiable. In some embodiments, the platform participant 402 can directly publish the logistic transaction record to the distributed consensus system.

At block 420, the platform participant 402 can request one or more popcode labels (e.g., in batch) from an agent of the provenance management system 404 or directly from the provenance management system 404. These popcode labels can be unassigned (e.g., not previously involved in a logistic transaction). In some embodiments, the popcode labels are pre-printed. In some embodiments, the platform participant 402 can receive the popcode labels as digital files that can be printed later on. The popcode labels encode private popcode keys thereon. In some embodiments, the private popcode keys are private asymmetric cryptography keys with matching public popcode keys. Those embodiments, the provenance management system 404 can have access to the public popcode keys corresponding to the private popcode keys encoded in the popcode labels.

In some embodiments, the provenance management system 404 generates popcode key pairs. In these embodiments, the provenance management system 404 passes the private popcode keys to its agents for encoding into popcode labels and stores the public popcode keys in its trusted store. In some embodiments, a company in partnership with the provenance management system 404 can generate the popcode key pairs. That company can pass the public popcode keys to the provenance management system 404 and create the popcode labels encoding the private popcode keys for distribution.

At a later time, the platform participant 402 can prepare at least a portion of those SKU packages for shipment. For example, the platform participant 402 can label one or more shipment packages with one or more of the popcode labels. At block 424, the platform participant 402 can generate a logistic transaction record and send the logistic transaction record to the provenance management system 404. The logistic transaction record can include a source address corresponding to an identity address of the platform participant 402. The platform participant 402 can sign the logistic transaction record using a private identity key corresponding to the identity address. The logistic transaction record can include a destination address corresponding to a popcode address. The popcode address can correspond to at least one of the popcode labels used to label the shipment packages.

At block 426, the provenance management system 404 can verify the logistic transaction record similar to block 416. At block 428, the provenance management system can publish the logistic transaction record to the distributed consensus system, similar to block 418. In some embodiments, the platform participant 402 can directly publish the logistic transaction record to the distributed consensus system.

Figure 5:
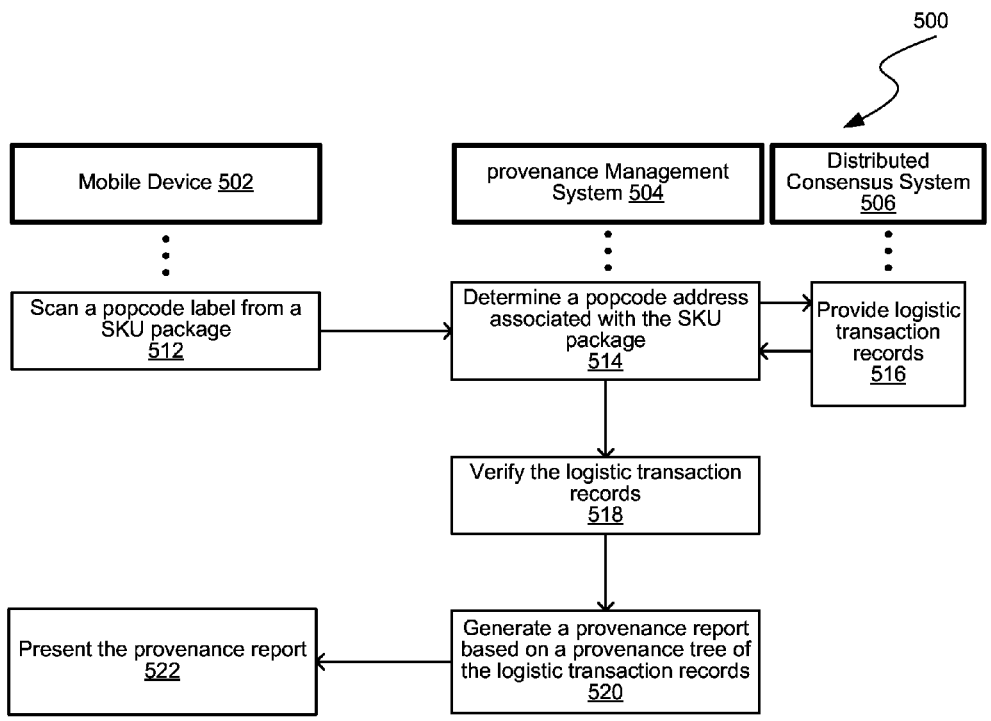
FIG. 5 is a data flow diagram illustrating a method of verifying provenance of a packaged good, in accordance with various embodiments.

FIG. 5 is a data flow diagram illustrating a method 500 of verifying provenance of a packaged good, in accordance with various embodiments. The method steps can be represented by blocks in the data flow diagram. The method 500 can involve at least a mobile application 502 (e.g., the agent application 108 of FIG. 1) and a provenance management system 504 (e.g., the provenance management system 102 of FIG. 1 or the provenance management system 200 of FIG. 2). For example, the mobile application 502 can represent a computing device (e.g., one of the participant devices 106) of an end consumer.

In some embodiments, the method 500 can facilitate the end consumer to find provenance information that helps to make a decision whether to trust a product. For example, before the end consumer decides to trust a product, the end consumer would want to verify the provenance of the product. The product can be identified as a SKU package value that is assigned either to an identity address of the end consumer or to an identity address of the retailer that the end consumer is purchasing from. The mobile application 502 can verify the SKU package value with the block chain implemented by a distributed consensus system 506, such as the distributed consensus system 114 of FIG. 1. The mobile application can request provenance information from the provenance management system 504 who is acting as a trust authority.

In some embodiments, the end consumer is a participant in a logistic platform, such as the cryptography-based logistic platform 100 of FIG. 1. That is, the end consumer has an identity profile stored in the provenance management system 504. In some embodiments, the end consumer is not a participant in the logistic platform. That is, the end consumer does not have an identity profile stored in the provenance management system 504.

At block 512, the mobile application 502 can scan a popcode label from the SKU package. In some embodiments, the scanning involves an optical scanner. In some embodiments, the scanning involves a radiofrequency scanner. The mobile application 502 can provide the scanned information (e.g., an image, a response signal, a digital sequence, a digital matrix, or any combination thereof) to the provenance management system 504. In some embodiments, the scanned information includes a private popcode key decoded from the popcode label. That is, in these embodiments, block 512 includes decoding the private popcode key by scanning the popcode label.

At block 514, the provenance management system 504 can determine a popcode address associated with the SKU package of interest based on the scanned information. For example, the provenance management system 504 can match the popcode address corresponding to the private popcode key. Based on the popcode address, the provenance management system 504 can access one or more logistic transaction records involving packages currently or previously associated with the popcode address. For example, the provenance management system 504 can extract the logistic transaction records from the distributed consensus system 506. At block 516, the distributed consensus system 506 can provide the logistic transaction records to the provenance management system 504. In some embodiments, the logistic transaction records form a provenance tree (e.g., one or more supply chains) that describes one or more entities that sourced the items that ended up in the SKU package.

At block 518, the provenance management system 504 can cryptographically verify the logistic transaction records against known public identity keys and known public popcode keys stored in its trusted storage. These public identity keys and the public popcode keys can respectively correspond to the source addresses and/or the destination addresses of the logistic transaction records. At block 520, the provenance management system 504 can generate a provenance report based on the provenance tree. At block 522, the mobile application 502 can present the provenance report to the requesting consumer.

In several embodiments, the provenance management system 504 acts as a trust authority that provides essential information to the end consumer about trustworthiness of SKU packages. This information, for example, can include the identity associated with the entity that associated an item type and quantity of the SKU package that the end consumer is interested in. This information can also include whether one or more unregistered identities or blacklisted identities in the trusted store of the trust authority were involved in sourcing the SKU package. An entity identity may be blacklisted because the participant entity corresponding to the entity identity has been reported for performing untrustworthy activity or that one or more private identity keys of the participant entity were compromised.

In several embodiments, the scanned information from a popcode label can be used to identify a SKU package value and the unique provenance for the SKU package value. The SKU package value describes one or more items inside an SKU package, such as item type and quantity. For each popcode address, the provenance management system 504 or an identity provider (e.g., the identity provider system 110 of FIG. 1) can identify the current "unspent" value at the popcode address. Here, an "unspent value" refers to SKU package value that has not been involved in a child logistic transaction. The provenance management system 504 or the identity provider can display the real world identities that are associated with the item type and the quantity described by the SKU package value. The provenance management system 504 or the identity provider can determine the real world identities associated with all stages of manufacturing, transport, repacking, unitization, assembly, combination, or any combination thereof, of goods and items into a single SKU package with the popcode label.

In several embodiments, the provenance management system 504 can track breaking of provenance trail to facilitate product recalls. The provenance management system 504 can flag certain characteristics of the provenance tree in the provenance report. For example, a chain of trust may be broken when at least one of the entities involved in the provenance tree is a blacklisted identity. In some embodiments, the provenance management system 504 can receive a request to blacklist a popcode label after shipment. This facilitates a recall of not only an affected popcode, but also downstream along the provenance tree (e.g., evidenced by child logistic transactions involving the same or a subset of the SKU package value) of the blacklisted popcode. To facilitate a recall, an entity (e.g., a manufacturer, a wholesaler, a distributor, or a retailer) can notify the provenance management system 504 that a popcode label (e.g., and thus the associated popcode address) can no longer be trusted by downstream entities. The provenance management system 504 can verify that the requested entity has signed a logistic transaction that places the SKU package value into the associated popcode address. In some embodiments, subscriber users can subscribe to the provenance trail a particular SKU package values. The provenance management system 504 can notify these subscriber users when the SKU package values of interest have been flagged for a recall. In some embodiments, the provenance management system 504 can provide further information to the subscriber users about the nature of the recall and specific actions that should be taken.

Figure 6A:
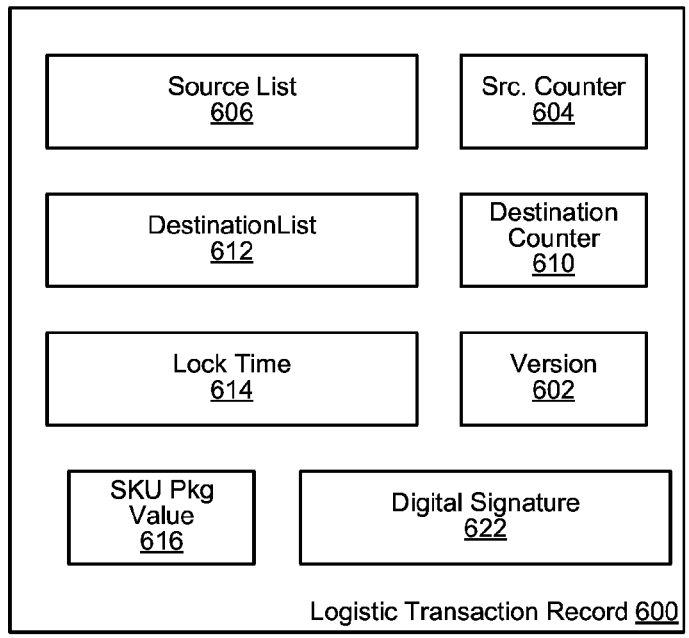
FIG. 6A is a block diagram illustrating an example of a logistic transaction record, in accordance with various embodiments.

FIG. 6A is a block diagram illustrating an example of a logistic transaction record 600, in accordance with various embodiments. The logistic transaction record 600 can describe a logistic transaction between at least two addresses. In some embodiments, the addresses can be the same. The addresses can be an identity address or a popcode address as described above. For example, the logistic transaction record 600 can be stored in a block of a block chain maintained by a distributed consensus system, such as the distributed consensus system 114 of FIG. 1. The logistic transaction record 600 can include a version number 602, a source counter 604, a source list 606, a destination counter 610, a destination list 612, a lock time 614, a SKU package value 616, a digital signature 622, or any combination thereof. The version number 602 can denote the format version of the logistic transaction record 600.

Figure 6B:
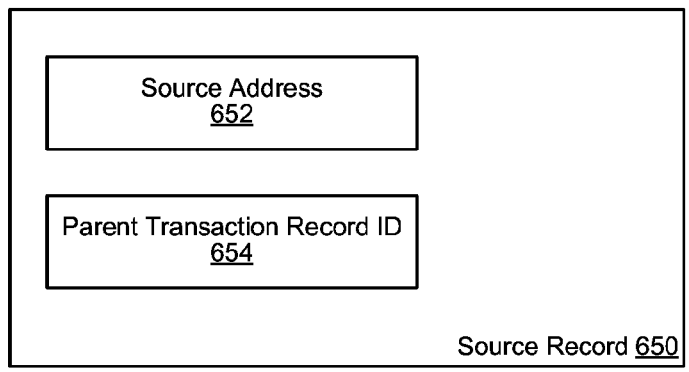
FIG. 6B is a block diagram illustrating an example of a source record, in accordance with various embodiments.

The source counter 604 is a positive integer denoting how many source addresses are involved in the logistic transaction. The source list 606 includes one or more source records (e.g., a source record 650 in FIG. 6B). FIG. 6B is a block diagram illustrating an example of the source record 650, in accordance with various embodiments. The source record 650 can include a source address 652 and/or a parent transaction record identifier 654. The parent transaction record identifier 654 enables a device with access to the block chain to identify a logistic transaction record that placed a SKU package value into the current source address (e.g., by listing the current source address as the destination address of the parent transaction record).

Figure 6C:
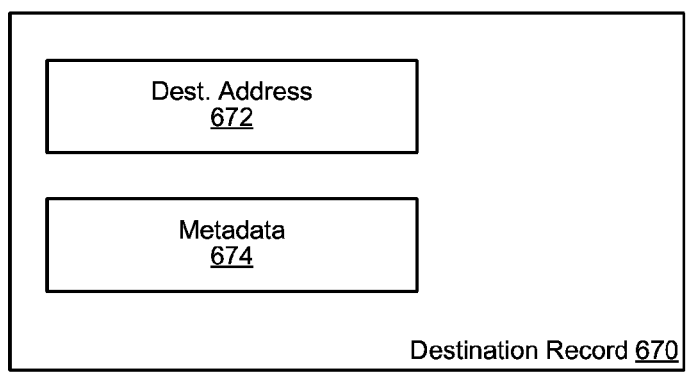
FIG. 6C is a block diagram illustrating an example of a destination record, in accordance with various embodiments.

The destination counter 610 is a positive integer denoting how many destination addresses are involved in the logistic transaction. The destination list 612 includes one or more destination records (e.g., a destination record 670 of FIG. 6C). FIG. 6C is a block diagram illustrating an example of the destination record 670, in accordance with various embodiments. The destination record 670 can include a destination address 672. The destination record 670 can also include metadata 674 involving a destination entity who owns the destination address. For example, the metadata can reference and invoice number, a user ID of the destination entity, an identity sequence number, or any combination thereof.

The lock time 614 can indicate the timestamps of when the logistic transaction is final. The lock time 614 can also indicate the block height of the block that the logistic transaction belongs in. The block height of a particular block is a number that describes how many blocks the particular blog is away from the first block in the block chain implemented by the distributed consensus system.

The SKU package value 616 includes an item type 618 and a quantity 620. The item type 618 is an enumeration, textual description, or other digital means of identifying what type of item(s) is involved in the logistic transaction record 600. The quantity 620 is a unit of measurement to count how many items of the item type 618 is involved in the logistic transaction record 600. In some embodiments, a source entity and a destination entity can negotiate for the designation of item types and their associated units of measurement outside of the logistic platform.

The digital signature 622 is a cryptographic signature made one or more private keys associated with the source addresses. For example, one of the private keys can be a private identity key (e.g., known only to agents of a source entity). For example, one of the private keys can be a private popcode key (e.g., available on a popcode label on the physical packaging of a SKU package or a receipt/invoice of the SKU package).

Figure 7:
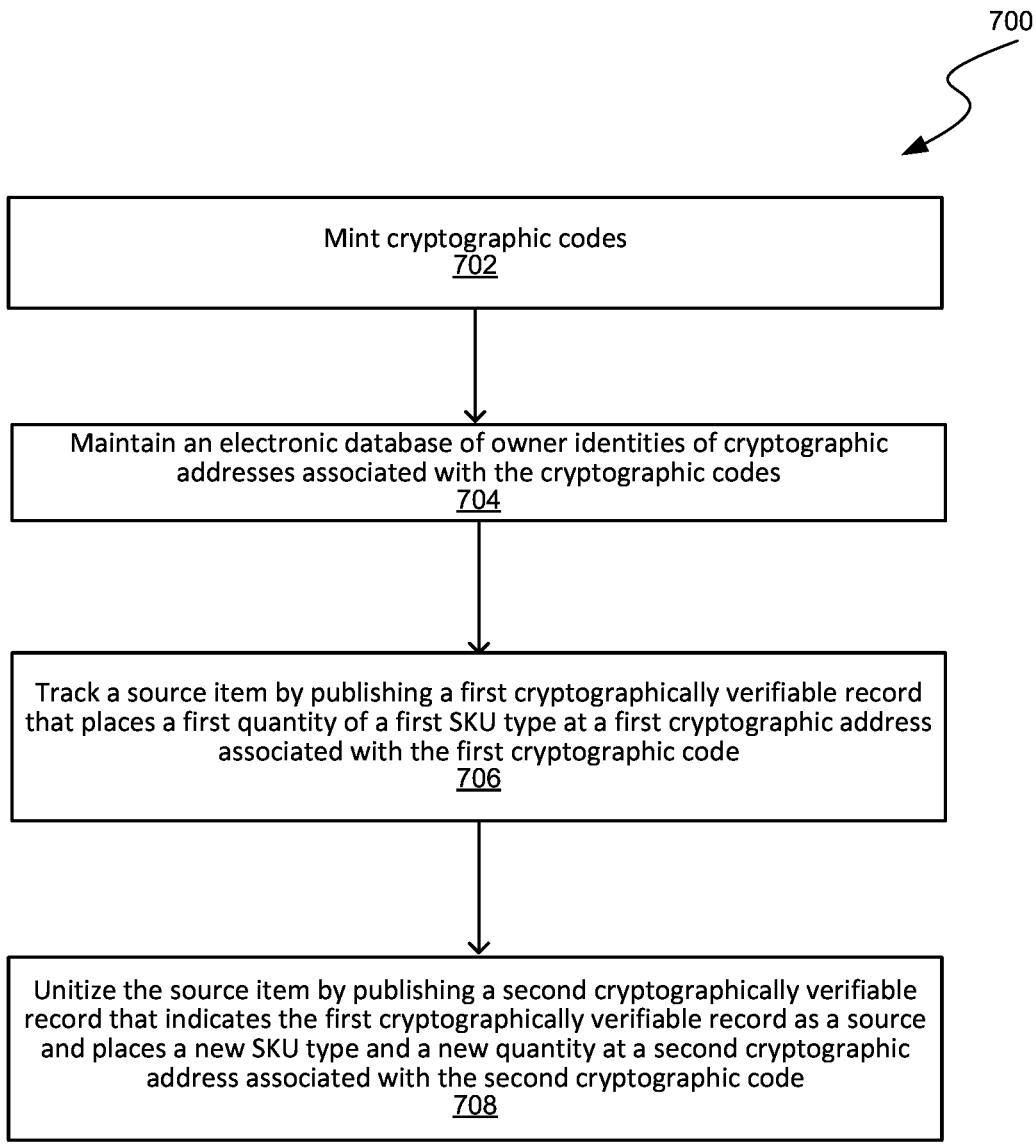
FIG. 7 is a flow chart illustrating a method of tracking end-to-end provenance of labeled goods despite re-unitization, repackaging, and/or transformation of the goods, in accordance with various embodiments.

FIG. 7 is a flow chart illustrating a method 700 of tracking end-to-end provenance of labeled goods despite re-unitization, repackaging, and/or transformation of the goods, in accordance with various embodiments. The method steps can be represented by blocks in the flow chart. The method 700 can begin at block 702, where a provenance management system (e.g., the provenance management system 102 of FIG. 1, the provenance management system 200 of FIG. 2, the provenance management system 404 of FIG. 4, or the provenance management system 504 of FIG. 5) mints (e.g., generates) cryptographic codes. Each cryptographic code can include a public key that serves to identify a cryptographic address in a distributed consensus network (e.g., the distributed consensus system 114 of FIG. 1 or the distributed consensus system 506 of FIG. 5) that maintains a cryptographically verifiable ledger. Each cryptographic code can also include a private key that can be distributed as a label for packaged goods. For example, the cryptographic codes can include a first cryptographic code and a second cryptographic code.

For example, the private key can be printed as a bar code label or embedded as a RFID label. Each of these labels can be attached to a package such that whoever possesses the package can extract/determine the private key from the label. In turn, a cryptographic signature of the private key can verify the possession of, and hence the ownership of the cryptographic address (e.g., associated with the public key that corresponds to the private key).

In several embodiments, the cryptographic codes are asymmetric encryption key pairs. In some embodiments, the provenance management system can delegate minting of the cryptographic codes to one or more distributed network computers and/or to one or more specifically assigned computing devices (e.g., the provenance management system can determine and select to which of the computing devices to delegate).

In some embodiments, at block 704, the provenance management system can maintain an electronic database of owner identities of cryptographic addresses associated with the cryptographic codes. For example, the first cryptographic address can be associated with a first entity in the electronic database and the second cryptographic address can be associated with a second entity in the electronic database. In several embodiments, an entity identifier in the electronic database can be associated with one or more cryptographic addresses.

At block 706, the provenance management system can track a source item by publishing a first cryptographically verifiable record that places a first quantity of a first stock keeping unit (SKU) type at a first cryptographic address associated with the first cryptographic code. This step can be responsive to receiving a request from an agent application (e.g., an instance of the agent application 108 of FIG. 1) running on a computing device of an owner of the first cryptographic address.

At block 708, the provenance management system can unitize the source item by publishing a second cryptographically verifiable record that indicates the first cryptographically verifiable record as a source and places a new SKU type and a new quantity at a second cryptographic address associated with the second cryptographic code. This step can be responsive to receiving a request from an agent application (e.g., an instance of the agent application 108 or the mobile application 502 of FIG. 5) running on a computing device of an owner of the second cryptographic address.

In some embodiments, the second cryptographically verifiable record can be both a record of unitization and a transfer of ownership. For example, the first cryptographic address and the second cryptographic address can be both associated with the same entity in the electronic database.

Figure 8:
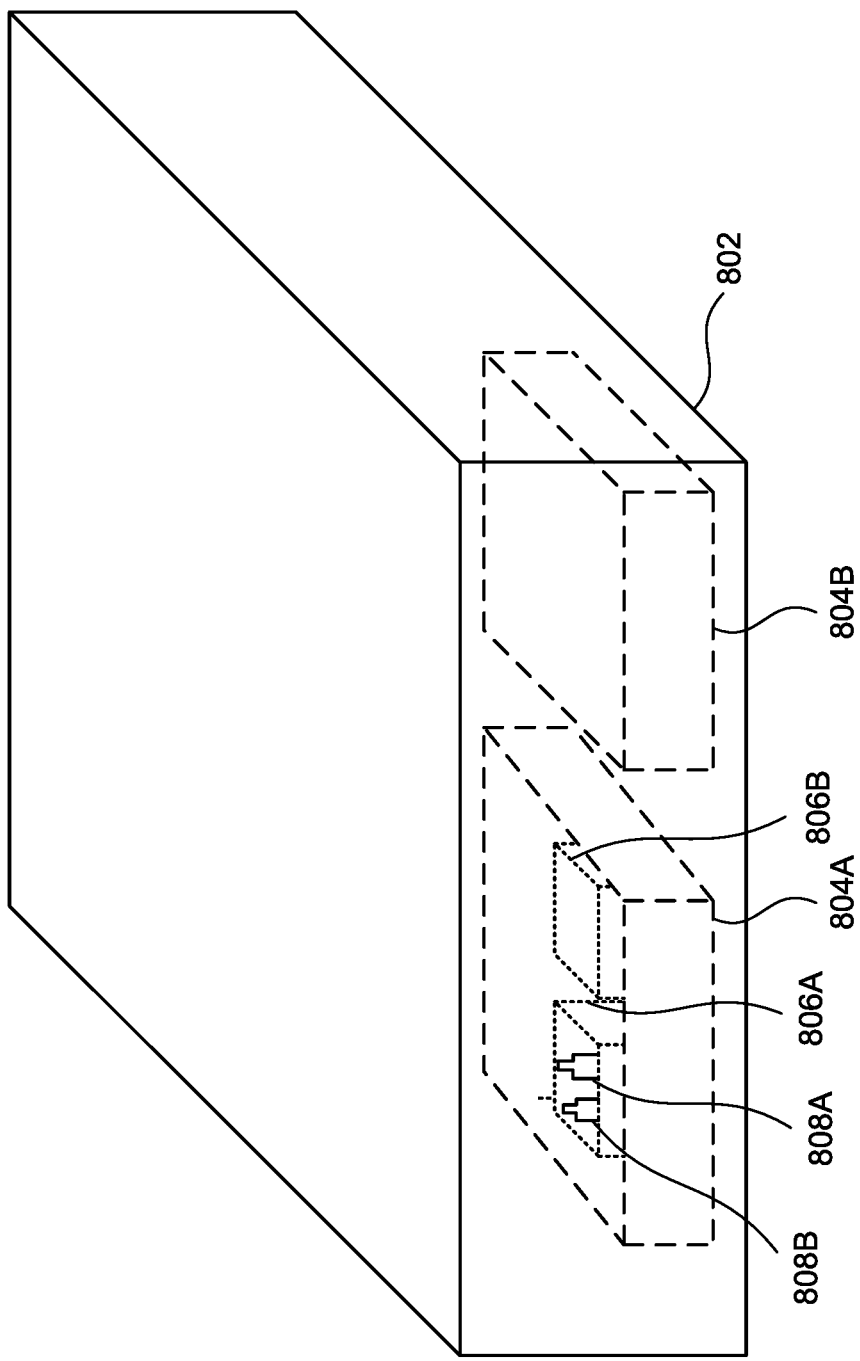
FIG. 8 is a perspective view illustrating SKU types that can be tracked by a provenance management system, in accordance of various embodiments.

FIG. 8 is a perspective view illustrating SKU types that can be tracked by a provenance management system (e.g., the provenance management system 102 of FIG. 1, the provenance management system 200 of FIG. 2, the provenance management system 404 of FIG. 4, or the provenance management system 504 of FIG. 5). For example, a container 802 is a unit of the SKU type labeled as "container." In some embodiments, this label is associated with a newly minted cryptographic address in a public ledger maintained by a distributed consensus system (e.g., the distributed consensus system 114 of FIG. 1 or the distributed consensus system 506 of FIG. 5). This cryptographic address can contain a first electronic record that specifies quantity (e.g., "1") of a first SKU type (e.g., a "container"). In some embodiments, multiple electronic records in the public ledger can be associated with a label of a "container." In these embodiments, the provenance information (e.g., a provenance tree) of these electronic records can be tracked independent of one another.

In the illustrated example, a second electronic record can specify quantity (e.g., "2") of a second SKU type (e.g., a "palette"). The second electronic record can indicate that it is sourcing its content from the first electronic record. For example, the second electronic record can indicate that the container 802 is unitized into a pallet 804A and a palette 804B.

In the illustrated example, a third electronic record can specify quantity (e.g., "4") of a third SKU type (e.g., a "case"). The third electronic record can indicate that it is sourcing its content from the second electronic record. For example, the third electronic record can indicate that the pallet 804A is unitized into a case 806A and a case 806B.

In the illustrated example, a fourth electronic record can specify quantity (e.g., "2") of a fourth SKU type (e.g., a "bottle"). The fourth electronic record can indicate that it is sourcing its content from the third electronic record. For example, the fourth electronic record can indicate that the case 806A is unitized into a bottle 808A and a bottle 808B.

Figure 9:
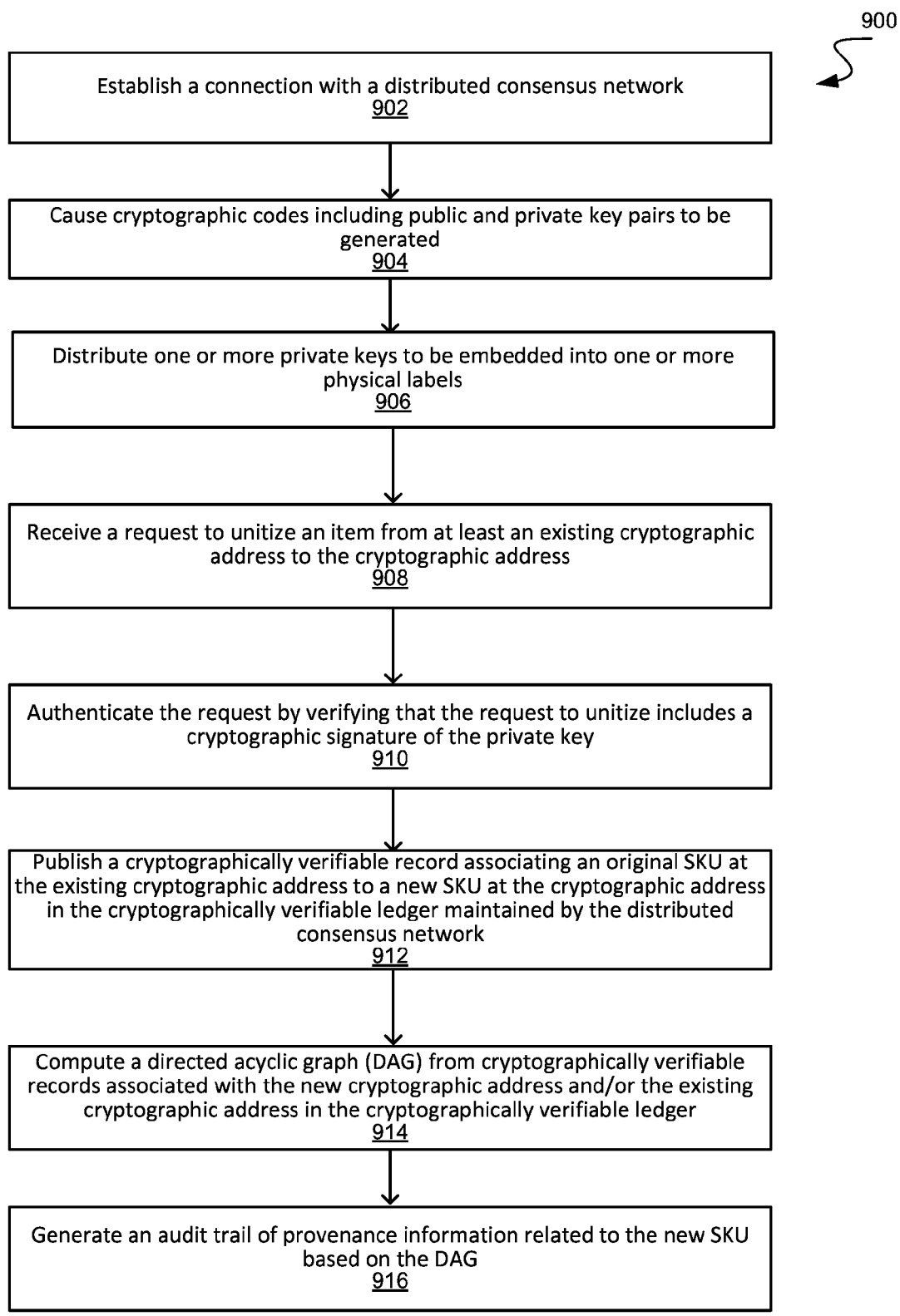
FIG. 9 is a flow chart illustrating a method of tracking a re-unitization of a package by publishing a cryptographically verifiable record to a distributed consensus network, in accordance with various embodiments.

FIG. 9 is a flow chart illustrating a method 900 of tracking a re-unitization of a package by publishing a cryptographically verifiable record to a distributed consensus network, in accordance with various embodiments. The method steps can be represented by blocks in the flow chart. The method 900 can begin at block 902, where a provenance management system (e.g., the provenance management system 102 of FIG. 1, the provenance management system 200 of FIG. 2, the provenance management system 404 of FIG. 4, or the provenance management system 504 of FIG. 5) establishes a connection with a distributed consensus network (e.g., the distributed consensus system 114 of FIG. 1 or the distributed consensus system 506 of FIG. 5). The distributed consensus network can maintain a cryptographically verifiable ledger utilizing a proof-of-work process.

An electronic record in the distributed consensus network can be accessible through a cryptographic address identified by a public key that corresponds to a private key for verifying ownership of the cryptographic address. For example, the cryptographic address can correspond to a popcode address, where ownership is established by possession of the popcode label. For another example, the cryptographic address can correspond to an identity address, where ownership is established via authentication via an identity server. The cryptographically verifiable ledger can be represented as a chain of blocks, each block containing one or more cryptographically verifiable records. The sequence of the blocks can be cryptographically protected from tampering.

In some embodiments, at block 904, the provenance management system can cause cryptographic codes including public and private key pairs to be generated. For example, the provenance management system can generate the cryptographic codes itself or delegate the task to one or more delegation computing nodes. In some embodiments, the step performed at block 904 is similar to the step performed at block 702. The generation of the cryptographic codes can be responsive to a client request or according to a preset schedule.

In several embodiments, at block 906, the provenance management system can distribute one or more private keys to be embedded into one or more physical labels. In turn, a company can buy, print, and/or make these labels to attach to one or more SKU packages.

At block 908, the provenance management system can receive a request to unitize an item from at least an existing cryptographic address to a fresh cryptographic address (e.g., new, currently unused, or recently recycled). For example, a first record in the distributed consensus network is associated with the existing cryptographic address and specifies an original stock keeping unit (SKU) associated with the item. The request to unitize can designate a new SKU. For example, the request to unitize can specify a first quantity of the original SKU and a second quantity of the new SKU. In this example, the published cryptographically verifiable record can specify the second quantity of the new SKU.

The original SKU and/or the new SKU can represent a physical object, a virtual object, a composite of physical and/or virtual objects, a package of physical and/or virtual objects, or any combination thereof. For example, a unit of the new SKU can include at least a subdivision of a unit of the original SKU. For example, a unit of the new SKU can include at least multiple units of the original SKU. For example, a unit of the new SKU can include a subdivision of a unit of the original SKU and a subdivision of a unit of a third SKU. For example, a unit of the new SKU can include multiple units of the original SKU and one or more units of a third SKU. Other transformation, repackaging, and/or recombination of one or more units or a subdivision of a unit of the original SKU into one or more units of the new SKU, with or without involvement of one or more units or subdivision of a unit of a third SKU, are contemplated by this disclosure. In some embodiments, the request to unitize the item specifies multiple existing cryptographic addresses corresponding to multiple previously established or recorded SKUs from which the new SKU is unitized. In some embodiments, the request to unitize the item designates multiple new SKUs from a single original SKU.

At block 910, the provenance management system can authenticate the request by verifying that the request to unitize includes a cryptographic signature of the private key. Responsive to authenticating the request, at block 912, the provenance management system can publish a cryptographically verifiable record associating the original SKU at the existing cryptographic address to the new SKU at the fresh cryptographic address in the cryptographically verifiable ledger maintained by the distributed consensus network.

In some embodiments, at block 914, the provenance management system can compute a directed acyclic graph (DAG) from cryptographically verifiable records associated with the fresh cryptographic address and/or the existing cryptographic address in the cryptographically verifiable ledger. The DAG can represent the supply provenance and/or distribution trail of one or more packaged items that have passed through the fresh cryptographic address and/or the existing cryptographic address. In some embodiments, at block 916, the provenance management system can generate an audit trail of provenance information related to the new SKU based on the DAG. For example, the audit trail can be used to determine distribution information related to the original SKU based on the DAG.

Figure 10:
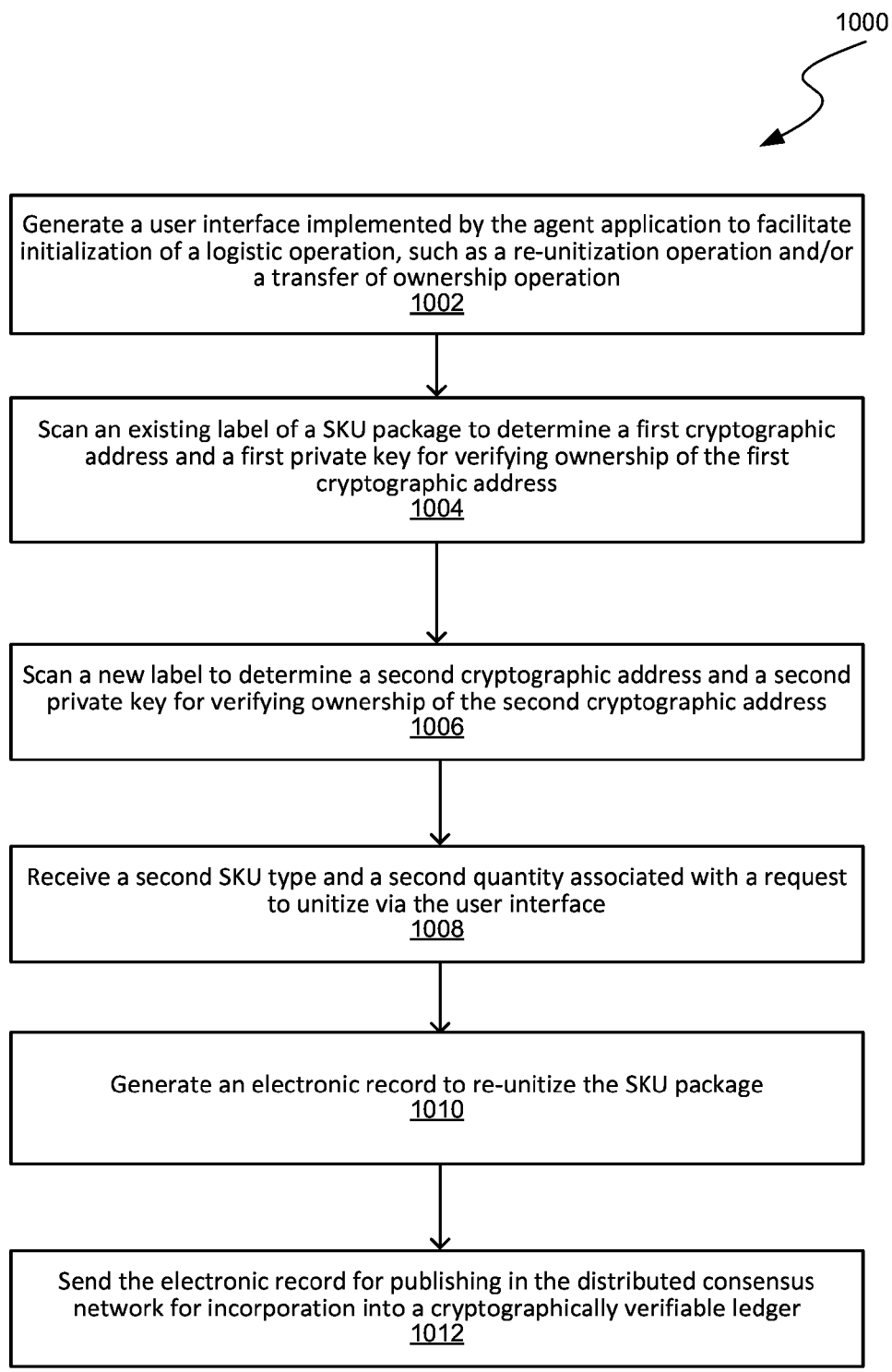
FIG. 10 is a flow chart illustrating a method of operating a computing device configured by an agent application of a provenance management system to report logistic operations, in accordance with various embodiments.

FIG. 10 is a flow chart illustrating a method 1000 of operating a computing device (e.g., one of the participant devices 106 of FIG. 1 or the platform participant 402 of FIG. 4) configured by an agent application (e.g., the agent application 108 of FIG. 1 or the mobile application 502 of FIG. 5) of a provenance management system (e.g., the provenance management system 102 of FIG. 1, the provenance management system 200 of FIG. 2, the provenance management system 404 of FIG. 4, or the provenance management system 504 of FIG. 5) to report logistic operations, in accordance with various embodiments. A logistic operation on a SKU package, for example, can be for transferring ownership, repackaging, relabeling, or any combination thereof, with respect to a SKU package. The method steps can be represented by blocks in the flow chart.

At block 1002, the computing device can generate a user interface implemented by the agent application to facilitate initialization of a logistic operation, such as a re-unitization operation and/or a transfer of ownership operation. At block 1004, the computing device scans an existing label of a stock keeping unit (SKU) package to determine a first cryptographic address and a first private key for verifying ownership of the first cryptographic address. This step can be triggered by detecting a user command received via the user interface implemented by the agent application. For example, the user interface can facilitate initialization of a re-unitization operation by enabling the computing device to scan for a source label of the SKU package in question. A user can send the user command (e.g., by pressing a button) to start scanning when a scanning component of the computing device is within range to detect and scan the existing label.

At block 1006, the computing device scans a new label to determine a second cryptographic address and a second private key for verifying ownership of the second cryptographic address. This step can be also be part of initializing the logistic operation. The user can send a user command to start scanning when a scanning component of the computing devices comes within range of the new label to scan the new label. In some scenarios, the new label replaces the existing label. In some scenarios, the new label is attached to a new packaging of the original SKU package or a unit within the original SKU package. In some scenarios, the new label has yet to be attached to a new packaging, but the user intends to finalize the logistic operation soon thereafter.

At block 1008, the computing device can receive, via the user interface, a second SKU type and a second quantity associated with a request to unitize. At block 1010, the computing device generates an electronic record to re-unitize the SKU package. The electronic record can refer to a previous electronic record in a distributed consensus network (e.g., the distributed consensus system 114 of FIG. 1 or the distributed consensus system 506 of FIG. 5) by referencing the existing label. In the distributed consensus network, a cryptographically verifiable ledger tracks a first quantity of a first SKU type at the first cryptographic address associated with the existing label. The electronic record can specify a transfer of at least a portion of content from the previous electronic record to the second cryptographic address associated with the new label. The electronic record can specify the content of the second cryptographic address as a second quantity of a second SKU type. The re-unitization operation can involve same or different SKU types from one cryptographic address to another. The re-unitization operation can also involve same or different quantities of the SKU types.

At block 1012, the computing device sends the electronic record for publishing in the distributed consensus network for incorporation into a cryptographically verifiable ledger of provenance transfer records. In some embodiments, the computing device can send the electronic record to the provenance management system for publishing to the distributed consensus network. In some embodiments, the computing device can send the electronic record directly to the distributed consensus network.

While processes or blocks are presented in a given order in the flowchart figures, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

FIG. 11 is a block diagram of an example of a computing device 1100, which may represent one or more computing device or server described herein, in accordance with various embodiments. The computing device 1100 can be one or more computing devices in the cryptography-based logistic platform 100 of FIG. 1, the provenance management system 200 of FIG. 2, and/or methods and processes described in this disclosure (e.g., the method 400 of FIG. 4, the method 500 of FIG. 5, the method 700 of FIG. 7, the method 900 of FIG. 9, and/or the method 1000 of FIG. 10). The computing device 1100 includes one or more processors 1110 and memory 1120 coupled to an interconnect 1130. The interconnect 1130 shown in FIG. 11 is an abstraction that represents any one or more separate physical buses, point-to-point connections, or both connected by appropriate bridges, adapters, or controllers. The interconnect 1130, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or a "Firewire".

The processor(s) 1110 is/are the central processing unit (CPU) of the computing device 1100 and thus controls the overall operation of the computing device 1100. In certain embodiments, the processor(s) 1110 accomplishes this by executing software or firmware stored in memory 1120. The processor(s) 1110 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1120 is or includes the main memory of the computing device 1100. The memory 1120 represents any form of random access memory (RAM), read-only memory (ROM), flash memory, or the like, or a combination of such devices. In use, the memory 1120 may contain a code 1170 containing instructions according to the system disclosed herein.

Also connected to the processor(s) 1110 through the interconnect 1130 are a network adapter 1140 and a storage adapter 1150. The network adapter 1140 provides the computing device 1100 with the ability to communicate with remote devices, over a network and may be, for example, an Ethernet adapter or Fibre Channel adapter. The network adapter 1140 may also provide the computing device 1100 with the ability to communicate with other computers. The storage adapter 1150 enables the computing device 1100 to access a persistent storage, and may be, for example, a Fibre Channel adapter or SCSI adapter.

The code 1170 stored in memory 1120 may be implemented as software and/or firmware to program the processor(s) 1110 to carry out actions described above. In certain embodiments, such software or firmware may be initially provided to the computing device 1100 by downloading it from a remote system through the computing device 1100 (e.g., via network adapter 1140).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

The figures depict various embodiments of this disclosure for purposes of illustration only. One skilled in the art will readily recognize from the following discussion that alternative embodiments of the structures and methods illustrated herein may be employed without departing from the principles of embodiments described herein.

What is claimed is:

1. A computer-implemented method comprising:
   implementing a computer interface with a distributed consensus network comprised of computing devices configured to verify one or more waiting logistic records for addition into one or more logistic record blocks in a block chain representing a cryptographically verifiable ledger, wherein the order of the block chain is cryptographically protected against tampering by the computing devices;
   tracking provenance of an item in a supply chain by at least identifying a sequence of inter-referencing cryptographically verifiable records having linking pairs of cryptographic addresses in the block chain, wherein the cryptographically verifiable records includes a first cryptographically verifiable record in a first block along the block chain, wherein the first cryptographically verifiable record places a first quantity of a first stock keeping unit (SKU) at a first cryptographic address;
   minting a cryptographic code comprising a private key associated with a label and a public key that identifies an unassigned cryptographic address in the cryptographically verifiable ledger, wherein ownership of the unassigned cryptographic address is verifiable via a cryptographic signature of the private key;
   distributing the private key to be embedded into a physical label for the item; and
   unitizing the item by publishing a second cryptographically verifiable record to a second block along the block chain, wherein the second cryptographically verifiable record indicates the first cryptographically verifiable record as a source record and associates a new SKU with a second cryptographic address, wherein a plurality of transfer records, including the first cryptographically verifiable record and the second cryptographically verifiable record, in the cryptographically verifiable ledger indicates a chain of custody of the item, wherein the second cryptographic address corresponds to the cryptographic code;

wherein a difference of SKU type between the first SKU in the supply chain of the item to the new SKU in the supply chain of the item denotes a repackaging or transformation of a group of goods including the item in between a transfer of custody.

2. The computer-implemented method of claim 1, further comprising:
verifying provenance of the new SKU by following the sequence of inter-referencing cryptographically verifiable records in the block chain to the second cryptographically verifiable record.

3. The computer-implemented method of claim 1, further comprising maintaining an electronic database that maps identities of entities to one or more entity-specific cryptographic addresses addressable in the cryptographically verifiable ledger.

4. The computer-implemented method of claim 1, wherein the first SKU represents at least a portion of the item, a package containing a form of the item, a previous form of the item, or any combination thereof.

5. The computer-implemented method of claim 3, wherein the first cryptographic address is associated with a first entity in the electronic database and the second cryptographic address is associated with a second entity in the electronic database.

6. The computer-implemented method of claim 3, wherein the first cryptographic address and the second cryptographic address are both associated with a first entity in the electronic database.

7. The computer-implemented method of claim 3, wherein an entity identifier in the electronic database is associated with multiple cryptographic addresses in the block chain.

8. A computer-implemented method comprising:
implementing a computer interface with a distributed consensus network comprised of computing devices configured to verify one or more waiting logistic records for addition into one or more logistic record blocks in a block chain representing a cryptographically verifiable ledger, wherein the order of the block chain is cryptographically protected against tampering by the computing devices;
tracking provenance of an item in a supply chain by identifying an existing record in the block chain, wherein the existing record places a first quantity of an original stock keeping unit (SKU) at an existing address;
minting a cryptographic code comprising a private key associated with a label and a public key that identifies an unassigned cryptographic address in the cryptographically verifiable ledger, wherein ownership of the unassigned cryptographic address is verifiable via a cryptographic signature of the private key;
distributing the private key to be embedded into a physical label for the item; and
unitizing the item by publishing a unitization record to the block chain, wherein the unitization record indicates the existing record as a source record and associates a new SKU and a new quantity at a destination address in the cryptographically verifiable ledger, wherein transaction records, including the existing record and the unitization record, in the block chain updates a chain of custody of at least an item between one or more linking pairs of cryptographic addresses;
wherein a difference of SKU type between the first SKU in the supply chain of the item to the new SKU in the supply chain of the item denotes a repackaging or transformation of a group of goods including the item in between a transfer of custody.

9. The computer-implemented method of claim 8, further comprising:
receiving a request to unitize, wherein the request to unitize designates the new quantity of the new SKU at the destination address; and
authenticating the request to unitize by verifying that the request to unitize includes a cryptographic signature corresponding to the new address, wherein said unitizing the item is in response to authenticating the request to unitize.

10. The computer-implemented method of claim 9, wherein the request to unitize designates multiple existing cryptographic addresses, including the existing address, corresponding to multiple old SKUs from which the new SKU is unitized from.

11. The computer-implemented method of claim 9, further comprising authenticating the request to unitize the item by verifying that the request to unitize includes a cryptographic signature corresponding to the destination address, and wherein the unitization record is published responsive to authenticating the request to unitize.

12. The computer-implemented method of claim 8, wherein each block in the block chain contains one or more transaction records and each block, except for a block at the beginning of the block chain, contains a hash value generated by processing content in a previous block via a hash function.

13. The computer-implemented method of claim 8, wherein a unit of the new SKU includes at least a subdivision of a unit of the original SKU or at least multiple units of the original SKU.

14. The computer-implemented method of claim 8, further comprising computing a directed acyclic graph from one or more cryptographically verifiable records, including the unitization record and the existing record, of the block chain to generate an audit trail for the chain of custody of the item.

15. A computer-readable data storage apparatus comprising a memory component storing executable instructions that are operable to be executed by a processor, wherein the memory component includes:
executable instructions to implement a computer interface with a distributed consensus network comprised of computing devices configured to verify one or more waiting logistic records for addition into one or more logistic record blocks in a block chain representing a cryptographically verifiable ledger, wherein the order of the block chain is cryptographically protected against tampering by the computing devices;
executable instructions to track provenance of an item in a supply chain by at least identifying a sequence of inter-referencing cryptographically verifiable records having linking pairs of cryptographic addresses in the block chain, wherein the cryptographically verifiable records includes a first cryptographically verifiable record in a first block along the block chain, wherein the first cryptographically verifiable record places a first quantity of a first stock keeping unit (SKU) at a first cryptographic address;
executable instructions to mint a cryptographic code comprising a private key associated with a label and a public key that identifies an unassigned cryptographic address in the cryptographically verifiable ledger, wherein ownership of the unassigned cryptographic address is verifiable via a cryptographic signature of the private key;

executable instructions to distribute the private key to be embedded into a physical label for the item; and executable instructions to unitize the item by publishing a second cryptographically verifiable record to a second block along the block chain, wherein the second cryptographically verifiable record indicates the first cryptographically verifiable record as a source record and associates a new SKU with a second cryptographic address, wherein a plurality of transfer records, including the first cryptographically verifiable record and the second cryptographically verifiable record, in the cryptographically verifiable ledger indicates a chain of custody of the item, wherein the second cryptographic address corresponds to the cryptographic code; wherein a difference of SKU type between the first SKU in the supply chain of the item to the new SKU in the supply chain of the item denotes a repackaging or transformation of a group of goods including the item in between a transfer of custody.

16. The computer-readable data storage apparatus of claim 15, wherein the first quantity is equal to a second quantity of the new SKU.

17. The computer-readable data storage apparatus of claim 15, wherein the first SKU is of a same SKU type as the new SKU.

18. The computer-readable data storage apparatus of claim 15, wherein the memory component further comprises executable instructions to generate a user interface to input a SKU type of the new SKU and a second quantity of the new SKU to generate the second cryptographically verifiable record.

* * * * *